(12) United States Patent
Sakamoto et al.

(10) Patent No.: US 8,014,439 B2
(45) Date of Patent: Sep. 6, 2011

(54) COMMUNICATION DEVICE AND COMMUNICATION METHOD

(75) Inventors: Takenori Sakamoto, Tokyo (JP); Katsuaki Abe, Kanagawa (JP); Akihiko Matsuoka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1280 days.

(21) Appl. No.: 10/593,974

(22) PCT Filed: Mar. 25, 2005

(86) PCT No.: PCT/JP2005/005503
§ 371 (c)(1),
(2), (4) Date: Sep. 22, 2006

(87) PCT Pub. No.: WO2005/094026
PCT Pub. Date: Oct. 6, 2005

(65) Prior Publication Data
US 2007/0147485 A1    Jun. 28, 2007

(30) Foreign Application Priority Data

Mar. 29, 2004  (JP) .................................. 2004-096569
Mar. 17, 2005  (JP) .................................. 2005-077580

(51) Int. Cl.
*H04B 1/38* (2006.01)

(52) U.S. Cl. ........ 375/219; 375/260; 375/346; 375/141; 375/326; 375/349; 455/78; 455/501; 455/504; 455/513; 455/63.1; 455/452.2; 455/135; 455/277.2; 370/278; 370/332; 370/333; 370/441; 370/442

(58) Field of Classification Search ............. 455/78, 455/84, 501, 504, 513, 63.1, 83, 452.2, 67.13, 455/135, 277.2; 370/278, 332, 333, 441, 370/442; 375/219, 260, 346, 135, 141
See application file for complete search history.

(56) References Cited

U.S. PATENT DOCUMENTS 6,115,417 A    9/2000  Matsunaga
6,813,309 B1 * 11/2004  Ogino ........................... 375/148
(Continued)

FOREIGN PATENT DOCUMENTS

EP    1363437    11/2003
(Continued)

OTHER PUBLICATIONS

PCT International Search Report dated Jun. 7, 2005.
(Continued)

*Primary Examiner* — Dac Ha
*Assistant Examiner* — Rahel Guarino
(74) *Attorney, Agent, or Firm* — Dickinson Wright PLLC

(57) ABSTRACT

A communication device selects an optimal modulation method even when a propagation path condition is changed. In the communication device, a second communication device has a transmission path condition estimation unit for estimating the propagation path condition change speed and a communication quality estimation unit for modifying the communication quality estimation method according to the speed of the change of the propagation path condition and for estimating the communication quality according to the modified estimation method. The information on the estimated propagation path condition and the information on the communication quality are transmitted from a transmission processing unit, and an adaptive modulation control unit of the first communication device sets a condition for selecting the modulation method and decides the modulation method according to the set condition and the information on the communication quality.

9 Claims, 15 Drawing Sheets

U.S. PATENT DOCUMENTS

| | | | |
|---|---|---|---|
| 6,985,752 B2 * | 1/2006 | Takano et al. | 455/522 |
| 7,062,287 B2 * | 6/2006 | Nakamura et al. | 455/522 |
| 7,151,948 B2 * | 12/2006 | Ishii et al. | 455/522 |
| 7,308,015 B2 * | 12/2007 | Takano et al. | 375/130 |
| 7,363,057 B2 * | 4/2008 | Ishii et al. | 455/562.1 |
| 7,650,261 B2 * | 1/2010 | Takiishi et al. | 703/2 |
| 2002/0136287 A1 * | 9/2002 | Heath et al. | 375/228 |
| 2002/0151311 A1 | 10/2002 | Miyoshi | |
| 2005/0128976 A1 | 6/2005 | Uehara et al. | |

FOREIGN PATENT DOCUMENTS

| | | |
|---|---|---|
| JP | 09200282 | 7/1997 |
| JP | 3240262 | 2/1998 |
| JP | 2002-118514 | 4/2002 |
| JP | 2003259437 | 9/2003 |
| JP | 2003-319457 | 11/2003 |
| JP | 2003338851 | 11/2003 |
| WO | 00/65793 | 11/2000 |

OTHER PUBLICATIONS

Notice of the Reasons for Rejection dated Jun. 15, 2010.

* cited by examiner

COMMUNICATION DEVICE AND COMMUNICATION METHOD

TECHNICAL FIELD

The present invention relates to a communication apparatus and communication method, and more particularly, to a communication apparatus and communication method suitable for use in adaptive modulation.

BACKGROUND ART

In recent years, in order to implement multimedia communication, information transmission schemes have been in need whereby large volume of information such as data and image, as well as speech, can be transmitted with high reliability at high speed. In particular, when transmission is carried out under an environment such as a mobile wireless transmission path where multipath fading, shadowing and the like may occur, it is an important issue to deal with these problems.

As one of techniques to solve such a problem, there is an adaptive modulation technique for performing transmission and reception, changing a modulation scheme adaptively according to communication quality of the propagation path (for example, see Patent Document 1). The adaptive modulation technique disclosed in Patent Document 1 is directed to a TDMA-FDD (Time Division Multiple Access-Frequency Division Duplex) scheme, where a downlink to transmit signals from base stations to mobile stations and uplink to transmit signals from the mobile stations to the base stations are formed with time-division multiplexed channels with different frequencies, and each of the base stations and mobile stations estimates communication quality of a propagation path in a transmission frequency for the station from a received signal of the station, and determines a modulation scheme for the communicating party according to the estimation result. To be more specific, each of the base station and mobile station selects a modulation scheme that is able to keep a BER at equal to or smaller than a predetermined value and achieve the highest information transmission speed.

Further, as an example of the method of selecting a modulation scheme according to an estimation result of communication quality, there is a method where a transmitting side transmits a transmission signal to which error correction codes are added, and a receiving side selects a modulation scheme based on a bit error rate (BER: Bit Error Rate) detected in error correction processing based on the error correction codes (for example, see Patent Document 2).

Patent Document 1: Japanese Patent No. 3240262
Patent Document 2: Japanese Patent Application Laid-Open No. HEI9-200282

DISCLOSURE OF INVENTION

Problems to be Solved by the Invention

However, with the above-mentioned technique, there is a case where the determination to switch between different modulation schemes is not made accurately, and an optimal modulation scheme cannot be selected. For example, even if determination to switch between modulation schemes is suitable in some communication environment, the determination may not be suitable in another communication environment.

For example, in a communication system where a transmission signal is configured on a frame basis and communication is performed on the frame basis, when a Carrier to Noise Ratio (CNR) is selected as a parameter indicating communication quality of a propagation path, and an average value of the past N frames of CNRs is used as a criterion to switch the modulation scheme, the relationship between a fading pitch and the number of frames for averaging N that maximizes the transmission efficiency indicates a monotone increasing characteristic. Here, the fading pitch is an interval between points where the envelop of received wave substantially drops, and hertz (Hz) is used as a unit of the pitch. Accordingly, in a conventional adaptive modulation scheme where a condition of one propagation path is assumed and the number of frames N is set at a fixed value, the transmission efficiency deteriorates when the propagation path condition changes.

Further, for example, when the CNR is used as the communication quality to be a criterion for switching between modulation schemes, it is more difficult to estimate an accurate CNR as the fading pitch increases, and it is particularly difficult when there is a time synchronization error. As a result, switching between modulation schemes cannot be performed suitably, and there is a problem that the transmission efficiency deteriorates.

Furthermore, when an FER (Frame Error Rate) is used as communication quality to be a criterion for switching between modulation schemes, in accordance with an increase of the fading pitch, a determination threshold tends to decrease that is used in determination to switch to a modulation scheme that maximizes the transmission efficiency. Accordingly, in the conventional adaptive modulation scheme where a condition of one propagation path is assumed and the threshold to switch between modulation schemes is set at a fixed value, there is an issue that transmission efficiency deteriorates when the propagation path condition changes.

Thus, in the conventional technique for adaptively changing the modulation scheme according to the communication quality of the propagation path, the case is not considered where the criterion for switching between modulation schemes changes when the propagation path condition changes. Therefore, it is not possible to select an optimal modulation scheme, and there is a problem that the transmission efficiency deteriorates.

It is therefore an object of the present invention to provide a communication apparatus and communication method for selecting an optimal modulation scheme even when the propagation path condition changes, and improving the transmission efficiency.

Means for Solving the Problem

A communication apparatus of the present invention adopts a configuration provided with a propagation path condition estimator that estimates speed of a change in a propagation path condition, a communication quality estimator that changes a method of estimating the communication quality based on the speed of the change in the propagation path condition and estimates communication quality, a transmitter that transmits the communication quality estimated in the communication quality estimator to a communicating party, a receiver that receives data modulated in a modulation scheme determined based on the communication quality by the communicating party, and a demodulator that demodulates the data.

A communication apparatus of the present invention adopts a configuration provided with a propagation path condition estimator that estimates speed of a change in a propagation path condition, a communication quality estimator that changes an estimation method based on the speed of the change in the propagation path condition and estimates communication quality, a threshold setter that sets a criterion to select a modulation scheme for use in communication with a communicating party from a plurality of modulation schemes based on information of the speed of the change in the propagation path condition, a modulation scheme selector that selects a modulation scheme from the communication quality by the criterion set by the threshold setter, and a transmitter that transmits information indicating the selected modulation scheme to the communicating party.

ADVANTAGEOUS INFLUENCE OF THE INVENTION

According to the communication apparatus and communication method, in communication using adaptive modulation which adaptively switches between modulation schemes according to communication quality, by estimating speed of a change in a propagation path condition, determining a method of estimating the communication quality based on the speed of the change in the propagation path condition, determining a modulation scheme for use in communication based on the communication quality estimated by the determined estimation method, and setting a threshold to select a modulation scheme based on the speed of the change in the propagation path condition, it is possible to select an optimal modulation scheme even when the propagation path condition changes, and improve the transmission efficiency.

BEST MODE FOR CARRYING OUT THE INVENTION

Figure 1:
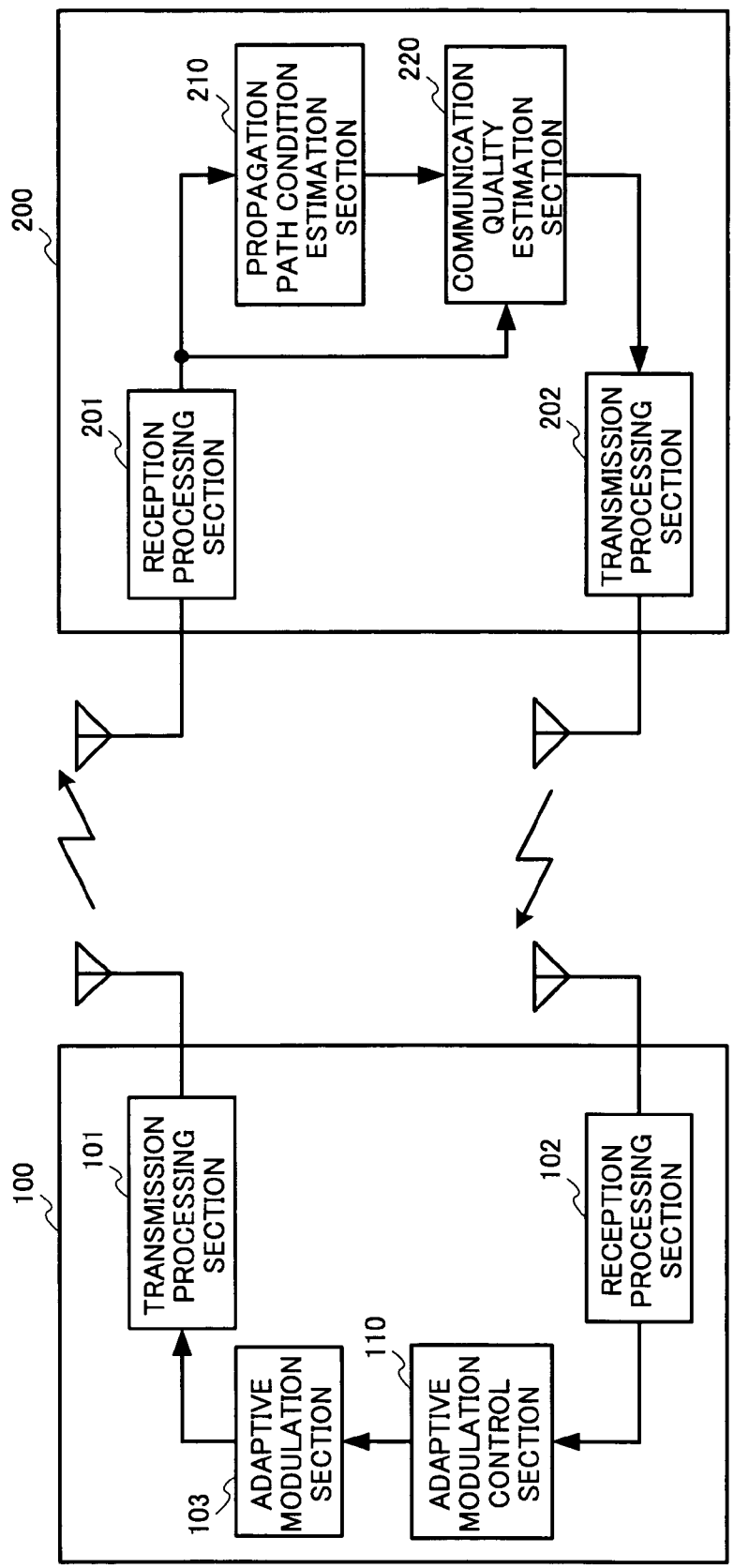
FIG. 1 is a block diagram illustrating a configuration of a communication system according to Embodiment 1 of the present invention.

Embodiments of the invention will be described below in detail with reference to the accompanying drawings. In addition, in the Embodiments, sections with the same functions are assigned the same reference numerals without further explanations.

Embodiment 1

FIG. 1 is a block diagram illustrating a configuration of a communication system according to Embodiment 1 of the present invention. In the communication system in FIG. 1, first communication apparatus 100 and second communication apparatus 200 perform radio communication using digital modulation. In addition, in this Embodiment, a communication path from first communication apparatus 100 to second communication apparatus 200 is referred to as downlink, and a communication path from second communication apparatus 200 to first communication apparatus 100 is referred to as uplink.

Figure 2:
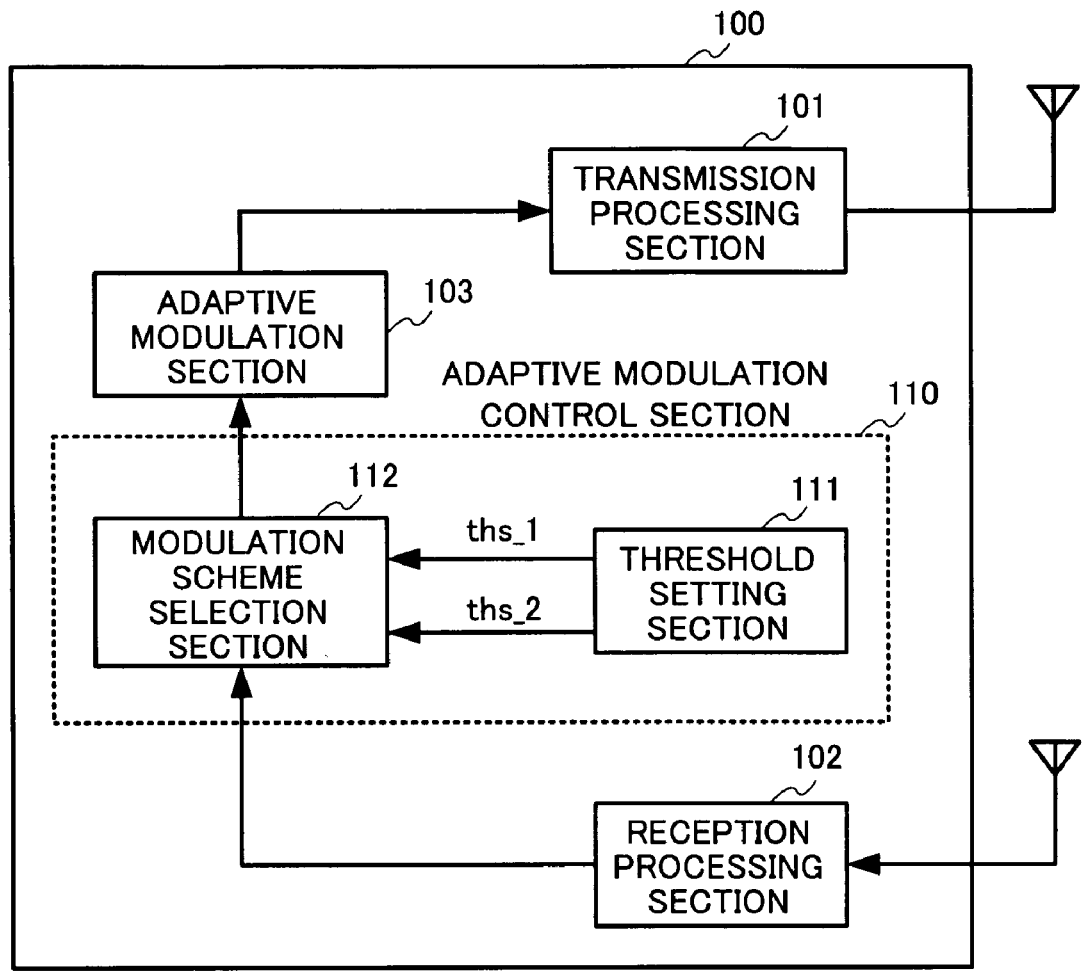
FIG. 2 is a block diagram illustrating a configuration of a first communication apparatus according to Embodiment 1 of the present invention.

First, a configuration of first communication apparatus 100 will be described with reference to FIG. 2. In FIG. 2, reception processing section 102 receives a radio signal transmitted from second communication apparatus 200, converts the radio signal from the radio frequency into a baseband frequency, performs quadrature modulation and synchronization processing on the result, and extracts information of communication quality in downlink to output to adaptive modulation control section 110. The information of communication quality includes, for example, a CNR (Carrier to Noise Ratio), BER (Bit Error Rate), FER (Frame Error Rate), PER (Packet Error Rate) and received signal intensity.

Adaptive modulation control section 110 determines a modulation scheme for use in downlink based on the information of communication quality outputted from reception processing section 102, and indicates the modulation scheme to adaptive modulation section 103. Threshold setting section 111 sets a determination threshold for use in determination to switch between modulation schemes to output to modulation scheme selection section 112. For example, modulation scheme selection section 112 compares a value of a CNR with the determination threshold, and thereby selects a modulation scheme for use in downlink.

Adaptive modulation section 103 modulates using a predetermined modulation scheme a header portion including information, such as a modulation scheme selected by adaptive modulation control section 110, transmission rate, data length, required for demodulation in second communication apparatus 200 and outputs the result to transmission processing section 101. Herein, the predetermined modulation scheme is determined fixedly in advance, and, for example, a BPSK or QPSK. Further, adaptive modulation section 103 modulates a payload portion including user data with the modulation scheme selected by adaptive modulation control section 110 and outputs the result to transmission processing section 101.

Transmission processing section 101 performs transmission processing such as frequency conversion and power amplification on the transmission data modulated by adaptive modulation section 103, and transmits the result to second communication apparatus 200.

Figure 3:
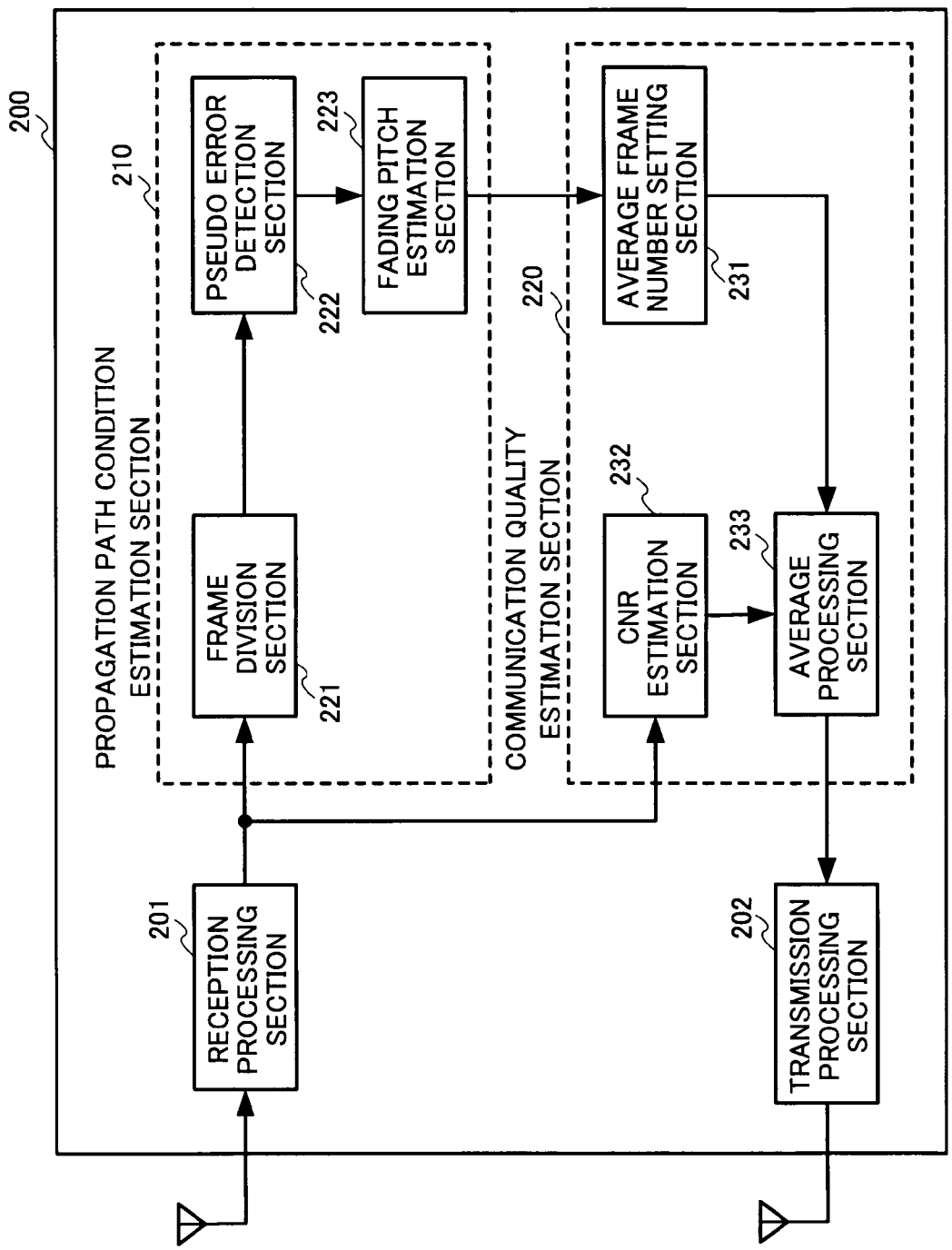
FIG. 3 is a block diagram illustrating a configuration of a second communication apparatus according to Embodiment 1 of the present invention.

Next, a configuration of second communication apparatus 200 will be described with reference to FIG. 3. Data is assumed to be transmitted on a predetermined frame basis in downlink. In FIG. 3, reception processing section 201 receives a signal transmitted from first communication apparatus 100, and performs on the received signal amplification processing, frequency conversion from the radio frequency to the baseband frequency, synchronization processing, quadrature demodulation and the like. Then, reception processing section 201 demodulates a header portion of the received signal using the predetermined modulation scheme (for example, a BPSK or QPSK), extracts information indicating a modulation scheme used in a payload portion, and demodulates the payload portion using the modulation scheme indicated by the extracted information. Further, reception processing section 201 outputs a signal among signals obtained in steps of the reception processing to propagation path condition estimation section 210 and communication quality estimation section 220. Herein, it is assumed that an IQ vector signal subjected to quadrature demodulation is outputted. It is assumed that the IQ vector signal is outputted on a basis of frames configured in first communication apparatus 100.

Based on the signal outputted from reception processing section 201, propagation path condition estimation section 210 estimates speed of a change in a propagation path condition, and outputs information indicating the speed of the change in the propagation path condition to communication quality estimation section 220. An index representing the speed of the change in the propagation path condition includes a fading pitch, moving speed of a mobile station, delay profile, fluctuation period of received signal power, and the like.

Figure 4:
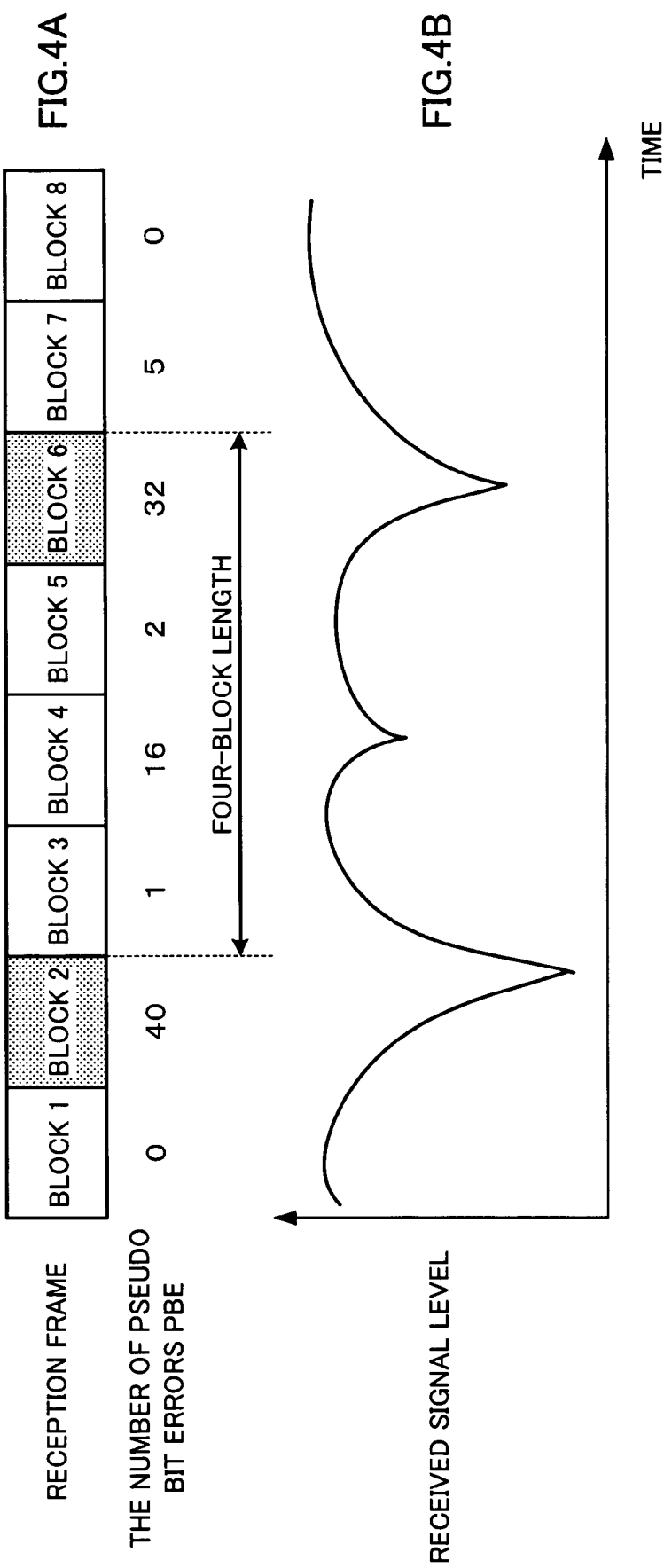
FIG. 4 is a view showing reception frames and fluctuations of a received signal level.

Frame division section 221 divides the IQ vector signal outputted from reception processing section 201 into one or a plurality of blocks at predetermined intervals. Herein, as shown in FIG. 4A, it is assumed that one reception frame is divided into eight blocks. Further, FIG. 4B shows fluctuation of the received signal level, where the horizontal axis indicates time, and the vertical axis indicates the received signal level. The signal divided per block is outputted to pseudo error detection section 222.

Pseudo error detection section 222 calculates the number of pseudo bit errors in a predetermined modulation scheme on the IQ vector signal per block outputted from frame division section 221, and outputs the number of pseudo bit errors PBE calculated per block to fading pitch estimation section 223.

As a method of detecting pseudo bit errors, there are "Katsuaki ABE and other two, "A study on communication quality estimation scheme in adaptive modulation", 2002, IEICE, General conference, B-5-99" and the like. This method of detecting pseudo bit errors is originally a technique for detecting pseudo bit errors in a modulation scheme which has a larger M-ary number than a modulation scheme which is being used in communication where the adaptive modulation technique is used in a pseudo manner, thereby providing an appropriate determination on switching to the modulation scheme which has a larger M-ary number.

In general, under the same propagation path environment, a modulation scheme which has a larger M-ary number has a larger number of bit errors. Therefore, by using the method for detecting pseudo bit errors, detection frequency of bit errors in a reception frame is higher than in the actually used modulation scheme. This means that the change in the propagation path condition in the reception frame can be estimated with higher accuracy. In this Embodiment, the number of pseudo bit errors in a case where communication for a signal per block is performed in 256QAM is calculated.

Fading pitch estimation section 223 estimates a fading pitch in the propagation path used in the current communication, based on the number of pseudo bit errors PBE calculated per block outputted from pseudo error detection section 222.

Herein, the fading pitch is an interval between points where the envelop of received wave substantially drops. As shown in FIG. 4B, it can be regarded that the received signal level is high in a block with a small number of pseudo bit errors PBE, and, inversely, the received signal level is low in a block with a large number of pseudo bit errors PBE, and the fading pitch is thereby estimated from the interval between blocks with a large number of pseudo bit errors PBE.

More specifically, an interval between blocks in which the number of pseudo bit errors PBE exceeds a predetermined threshold ths_e is obtained. For example, when ths_e=30, in the case of FIG. 4, an interval between drops in the received signal level is an interval between blocks 2 and 6, that is, four-block length. Herein, when one block length is $T_b$ seconds, the fading pitch is $\frac{1}{4} T_b$[Hz]. This value is outputted to average frame number setting section 231 in communication quality estimation section 220 as the fading pitch. In addition, when the fading pitch is random, the fading pitch may be calculated as an average value of intervals between blocks in which the number of pseudo bit errors PBE exceeds a predetermined threshold ths_e.

Thus, propagation path condition estimation section 210 estimates the fading pitch from the received signal, so that it is possible to estimate the speed of the change in the propagation path condition.

Communication quality estimation section 220 measures the reception quality of the signal outputted from reception processing section 201 at predetermined time intervals. Based on the information of the change in the propagation path condition outputted from propagation path condition estimation section 210, communication quality estimation section 220 determines the number of frames for averaging the information of the reception quality, and averages the information of the reception quality of the determined number of frames. Then, communication quality estimation section 220 outputs information of the averaged reception quality to transmission processing section 202.

Based on the fading pitch outputted from fading pitch estimation section 223, average frame number setting section 231 sets the number of frames for averaging N and outputs the number of frames for averaging N to average processing section 233.

Figure 5:
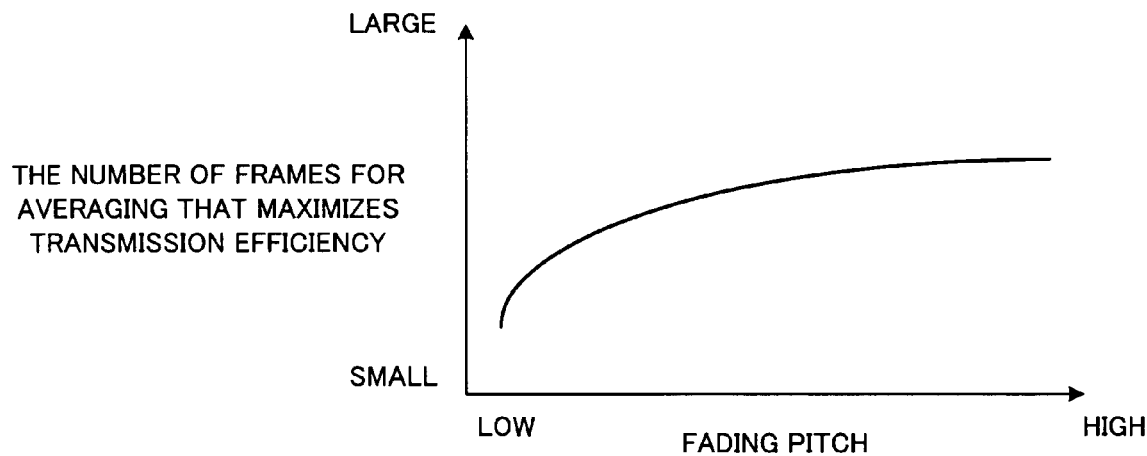
FIG. 5 is a graph showing the relationship between the fading pitch and the number of frames for averaging.

In other words, average frame number setting section 231 uses the relationship between the number of frames for averaging N the reception quality and the fading pitch. As shown in FIG. 5, in the relationship between the number of frames for averaging N and the fading pitch, when the fading pitch is high, compared to the case where the fading pitch is low, the transmission efficiency tends to improve by increasing the number of frames for averaging N the reception quality.

More specifically, the transmission efficiency improves by increasing the number of frames for averaging N in accordance with an increase of the fading pitch, and, inversely, the transmission efficiency improves by decreasing the number of frames for averaging N in accordance with a decrease of the fading pitch. For example, this characteristic is beforehand prepared as a table in average frame number setting section 231, and average frame number setting section 231 refers to the table according to a value of the fading pitch and sets the number of frames for averaging N.

CNR estimation section 232 estimates a CNR value of a received signal in downlink from a received frame signal, and outputs the estimated CNR value to average processing section 233. As a method for estimating a CNR value, for example, there is a method of estimating the value from dispersion conditions of I/Q vectors on the IQ plane that are obtained after quadrature demodulation of a received signal.

According to the number of frames for averaging N outputted from average frame number setting section 231, average processing section 233 calculates an average CNR value of the estimated CNR values of N frames, and thereby reduces the influences of estimated errors the CNR. Then, average processing section 233 outputs the average CNR value to transmission processing section 202. The average CNR value is calculated by equation (1).

[Equation 1]

$$s8(t) = \frac{1}{N} \sum_{i=t}^{t-(N-1)} s7(i) \quad (1)$$

Herein, s7 indicates a CNR value, s8 indicates an average CNR value, and N indicates the number of frames for averaging.

Transmission processing section 202 modulates data including the average CNR value, converts the data from the baseband frequency to the radio frequency, performs power amplification, transmits the result as a radio signal, and thereby reports the communication quality of downlink to first communication apparatus 100.

Thus, second communication apparatus 200 estimates the fading pitch indicating the speed of the change in the propagation path condition, and based on the estimated fading pitch, determines the length of the term (the number of frames) for averaging the reception quality.

A case will be described below specifically in detail where first communication apparatus 100 switches between three kinds of modulation schemes, QPSK, 16QAM and 64QAM, based on the communication quality (average CNR value) measured by second communication apparatus 200.

In first communication apparatus 100, reception processing section 102 receives a signal transmitted from second communication apparatus 200, performs predetermined reception processing such as quadrature demodulation processing, synchronization processing on the received signal, and extracts an average CNR value indicating the communication quality of downlink to output to adaptive modulation control section 110.

Threshold setting section 111 sets determination thresholds ths_1 and ths_2 for use in determination to switch between modulation schemes to output to modulation scheme selection section 112. Herein, ths_1 is a determination threshold for use in determination to switch between QPSK and 16QAM, and ths_2 is a determination threshold for use in determination to switch between 16QAM and 64QAM.

Figure 6:
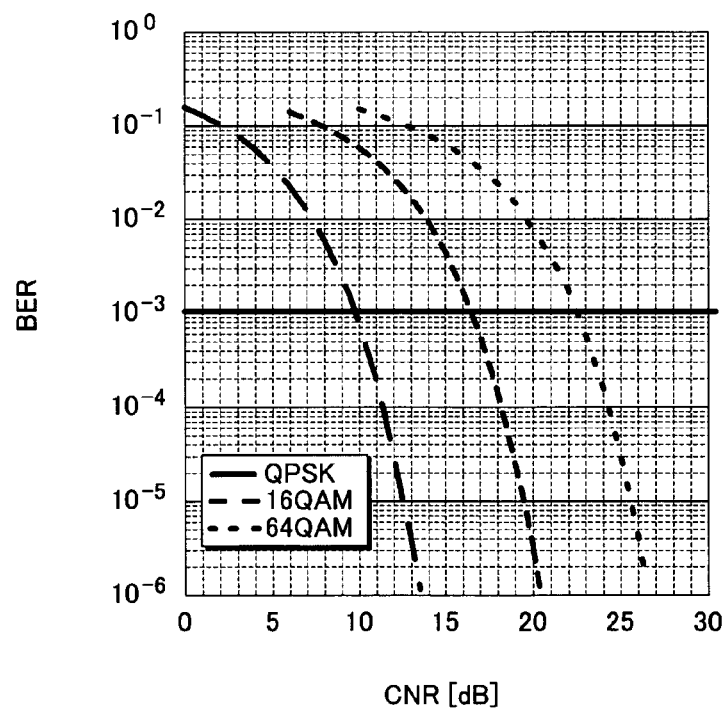
FIG. 6 is a graph showing the relationship between a CNR and a BER in each modulation scheme.

To be more specific, in this Embodiment, since average CNR value s11 is used as the communication quality to be a criterion for switching between modulation schemes, the threshold is determined from the relationship between a CNR and BER. FIG. 6 is a graph showing the relationship between a CNR and a BER in each modulation scheme. For example, as shown in FIG. 6, when it is assumed to switch between modulation schemes so that the BER in the communication system does not exceed $10^{-3}$, ths_1 is set at 16.5 dB, and ths_2 is set at 22.5 dB (ths_1=16.5 dB, ths_2=22.5 dB).

Modulation scheme selection section 112 compares average CNR value s11 with determination thresholds ths_1 and ths_2, and thereby selects a modulation scheme for use in downlink. To be more specific, modulation scheme selection section 112 selects QPSK when average CNR value s11 satisfies following equation (2), selects 16QAM when average CNR value s11 satisfies following equation (3) or selects 64QAM when average CNR value s11 satisfies following equation (4). Then, modulation scheme selection section 112 outputs modulation scheme information indicating the selected modulation scheme to adaptive modulation section 103 and indicates the modulation scheme to adaptive modulation section 103.

[Equation 2]

$$s11 < ths\_1 \quad (2)$$

[Equation 3]

$$ths\_1 \leq s11 < ths\_2 \quad (3)$$

[Equation 4]

$$ths\_2 \leq s11 \quad (4)$$

Adaptive modulation section 103 modulates transmission data by the modulation scheme indicated by the modulation scheme information, and outputs the adaptive modulation signal to transmission processing section 101.

Thus, according to Embodiment 1, the speed of the change in the propagation path condition is estimated from a downlink received signal, the length of the term for averaging reception quality is set according to the speed of the change in the propagation path condition, thereby increasing the reliability of the measurement result of the reception quality, so that it is possible to determine a modulation scheme to be switched to according to the reception quality with high accuracy. Accordingly, the transmission efficiency can be improved.

A unit of frame used in communication is not particularly limited, and, for example, when communication is performed on a time-slot basis by time division multiplexing scheme, a unit may be a single time slot or formed with a plurality of time slots.

Further, in this Embodiment, pseudo error detection section 222 is configured to calculate the number of pseudo bit errors on a signal per block in this Embodiment, but this is by no means limiting, and pseudo error detection section 222 may be configured to calculate a pseudo bit error rate per block. Furthermore, pseudo error detection section 222 is configured to obtain the fading pitch based on the number of pseudo bit errors, but this is by no means limiting, and, for example, may be configured to calculate an actual bit error rate, or CNR and obtain the fading pitch based on a distribution of these values.

Moreover, in this Embodiment, pseudo error detection section 222 is configured to calculate the number of pseudo bit errors in communication in 256QAM using a signal per block, but this is by no means limiting. It is only necessary to use the number of pseudo bit errors in a modulation scheme which has a larger M-ary number than the modulation scheme used in the received signal. For example, when the modulation scheme of the received signal is QPSK, the number of pseudo bit errors in the case of communication in 16QAM may be calculated.

Further, in this Embodiment, the fading pitch is used as a parameter indicating the speed of the change in the propagation path condition, but this is by no means limiting, and, for example, moving speed of a mobile station, delay profile, and fluctuation period of received signal power may be used.

Furthermore, this Embodiment is configured to use a block unit divided by frame division section 221 in calculation of a fading pitch, but this is by no means limiting. For example, this Embodiment may be configured to calculate the fading pitch on a frame basis instead of a block basis. In this case, the number of pseudo bit errors is also calculated on a frame basis in pseudo error detection section 222.

Still furthermore, in this Embodiment, communication quality estimation section 220 is configured to estimate the CNR as communication quality, but this is by no means limiting. For example, communication quality estimation section 220 may be configured to estimate the BER, FER, PER, received signal intensity or the like, may be configured to use a value obtained by averaging numbers of pseudo bit errors calculated per block by propagation path condition estimation section 210 over a number of (N) frames, or may be configured to estimate a plurality of types of communication quality.

Figure 7:
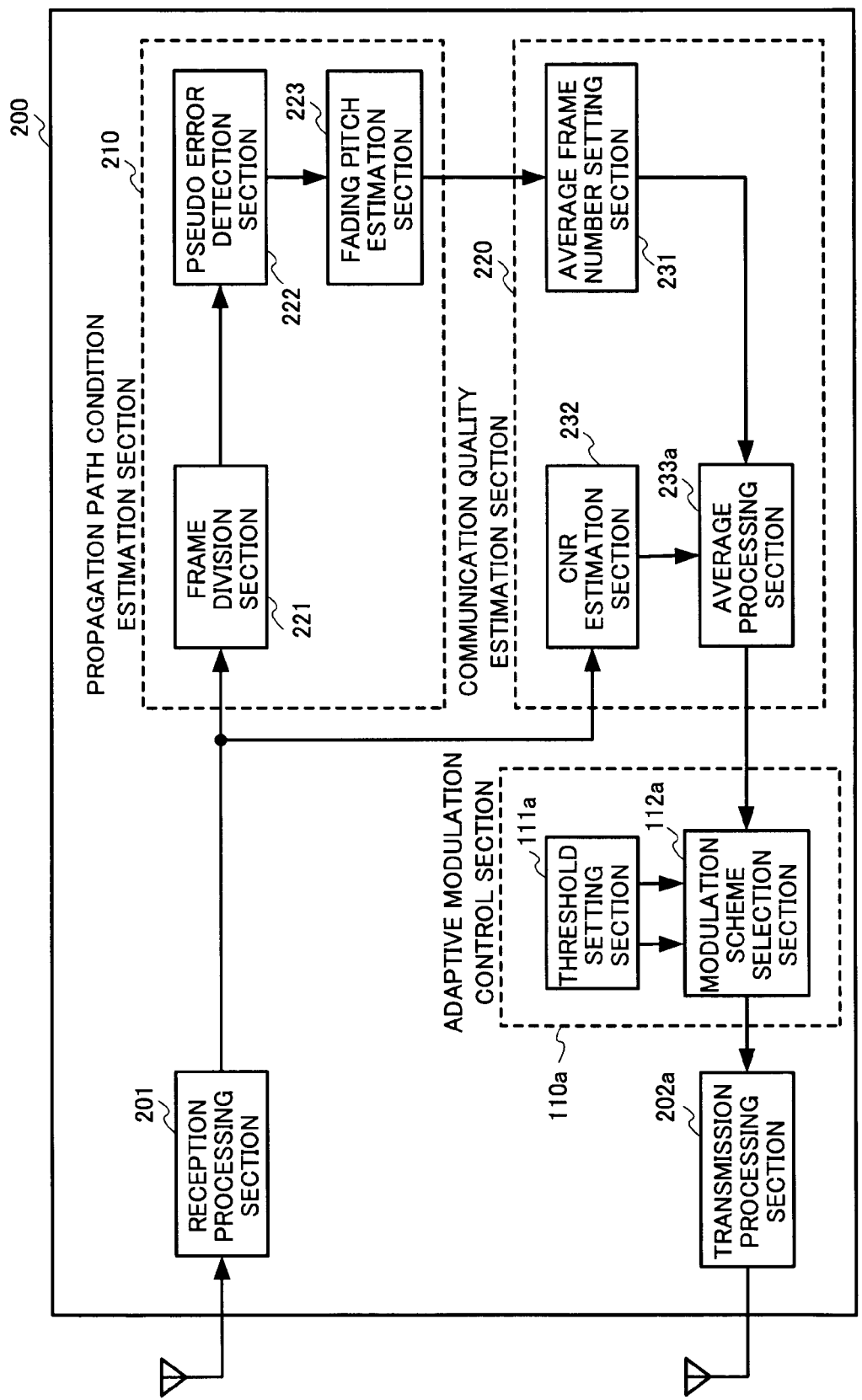
FIG. 7 is a block diagram illustrating another configuration of the second communication apparatus according to Embodiment 1 of the present invention.

Moreover, in this Embodiment, the first communication apparatus is configured to make a determination to switch between modulation schemes, but this is by no means limiting, and adaptive modulation control section 110 of the first communication apparatus may be disposed in the second communication apparatus. FIG. 7 shows a configuration of second communication apparatus 200*a* in this case.

As shown in FIG. 7, it is only necessary to have a configuration in which average CNR value s8 outputted from average processing section 233*a* is inputted to modulation scheme selection section 112*a* in adaptive modulation control section 110*a*.

In such a configuration, modulation scheme selection section 112*a* compares an average CNR value inputted from average processing section 233*a* with a threshold inputted from threshold setting section 111*a*, and selects a modulation scheme. Then, modulation scheme selection section 112*a* outputs the modulation scheme information indicating the selected modulation scheme to transmission processing section 202*a*, and transmission processing section 202*a* transmits the modulation scheme information to first communication apparatus 100*a*.

Figure 8:
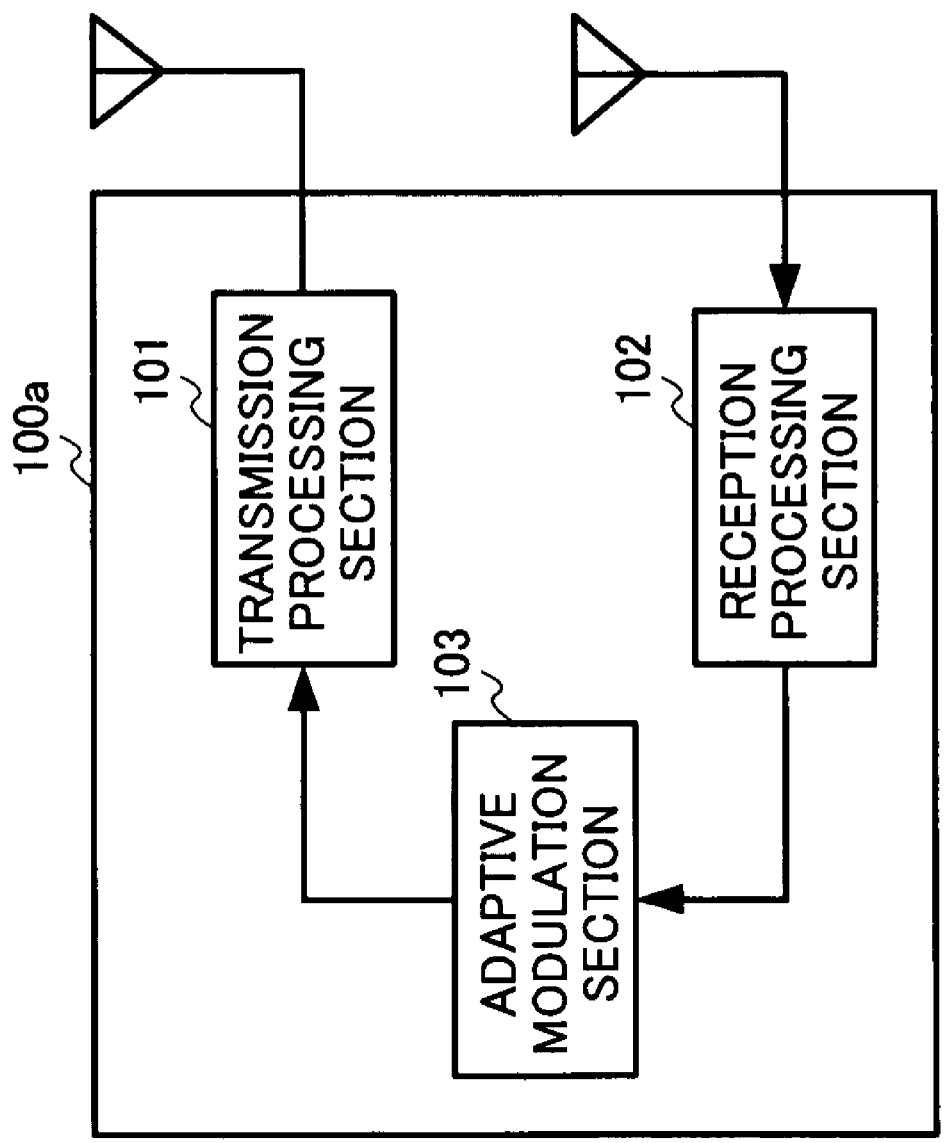
FIG. 8 is a block diagram illustrating another configuration of the first communication apparatus according to Embodiment 1 of the present invention.

In first communication apparatus 100*a*, as shown in FIG. 8, reception processing section 102 extracts the modulation scheme information from the received signal, and based on the extracted modulation scheme information, adaptive modulation section 103 performs modulation processing on transmission data. By this means, in uplink, even when an amount of information that can be transmitted is small, and a large amount of information such as a CNR value cannot be transmitted, adaptive modulation can be performed.

Further, in this Embodiment, a modulation scheme for use in uplink is not particularly limited, and any modulation scheme can be used that enables to transmit data more reliably. For example, BPSK and QPSK may be used.

Embodiment 2

Embodiment 2 of the present invention describes a case where the condition of a downlink propagation path is estimated, a parameter indicating the communication quality to be a criterion for switching between modulation schemes is selected according to an estimation result, and the modulation schemes are switched based on the estimation result by the selected parameter of the communication quality. In addition, in this Embodiment, a communication path from first communication apparatus 700 to second communication apparatus 800 is referred to as downlink, while a communication path from second communication apparatus 800 to first communication apparatus 700 is referred to as uplink.

Figure 9:
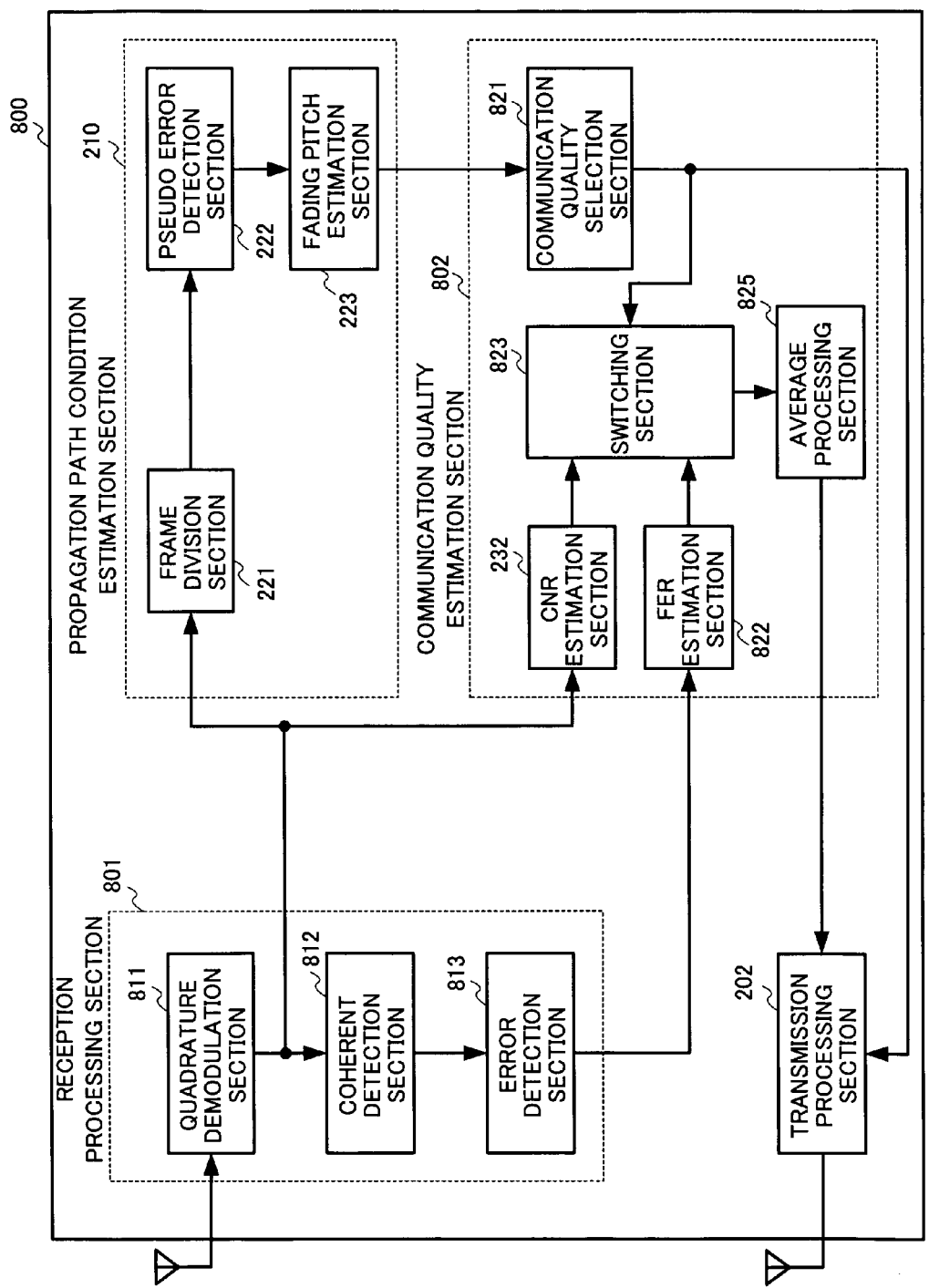
FIG. 9 is a block diagram illustrating a configuration of a second communication apparatus according to Embodiment 2 of the present invention.

FIG. 9 is a block diagram illustrating a configuration of second communication apparatus 800 according to Embodiment 2 of the present invention. In addition, it is assumed that data is transmitted on a predetermined frame basis in downlink. In FIG. 9, reception processing section 801 receives a radio signal transmitted from first communication apparatus 700, and performs predetermined processing on the received signal such as amplification, frequency conversion, determination of modulation scheme, quadrature demodulation, detection, error correction, and error detection. Then, reception processing section 801 outputs an IQ vector signal subjected to quadrature demodulation to frame division section 221 and CNR estimation section 232, and further outputs an error detection result per reception frame to FER estimation section 822.

Quadrature demodulation section 811 performs quadrature demodulation on the radio signal transmitted from first communication apparatus 700, acquires the IQ vector signal, and outputs the IQ vector signal to coherent detection section 812, frame division section 221 and CNR estimation section 232.

Coherent detection section 812 performs coherent detection processing on the IQ vector signal outputted from quadrature demodulation section 811, and outputs bit data to error detection section 813.

Error detection section 813 performs error correction and error detection processing on the bit data outputted from coherent detection section 812 using error correction codes and error detection codes added in first communication apparatus 700, and outputs an error detection result per reception frame to FER estimation section 822.

Communication quality estimation section 802 estimates the communication quality by a plurality of estimation methods from the IQ vector signal outputted from quadrature demodulation section 811 and the error detection result outputted from error detection section 813 in reception processing section 801. In other words, communication quality estimation section 802 selects a parameter indicating the communication quality to be a criterion for switching between modulation schemes according to the fading pitch. Communication quality estimation section 802 estimates the communication quality of downlink using the selected parameter, and outputs information indicating the selected parameter and the estimation result by the selected parameter to transmission processing section 202.

The parameter indicating the communication quality includes a BER, FER, CNR, PER, received signal intensity and the like. In this Embodiment, the CNR and FER are estimated, and based on the fading pitch, one of the CNR and FER is selected.

Based on the fading pitch outputted from fading pitch estimation section 223 in propagation path condition estimation section 210, communication quality selection section 821 selects a parameter indicating the communication quality to be a criterion for switching between modulation schemes, and outputs information indicating the selected parameter to switching section 823 and transmission processing section 202.

In this Embodiment, the CNR and FER are used as parameters indicating the communication quality, and generally, the CNR can indicate the communication quality more strictly than the FER. However, the fading pitch is higher in the propagation path, the fluctuation in envelop of the received signal and the fluctuation in the phase become fast for a frame length, and it becomes difficult to compensate amplitude and phase of the received signal, and therefore accuracy in CNR estimation may deteriorate. Meanwhile, the FER has less reliability as the communication quality than the CNR, but can be estimated by the presence or absence of bit errors in a reception frame.

Figure 11A:
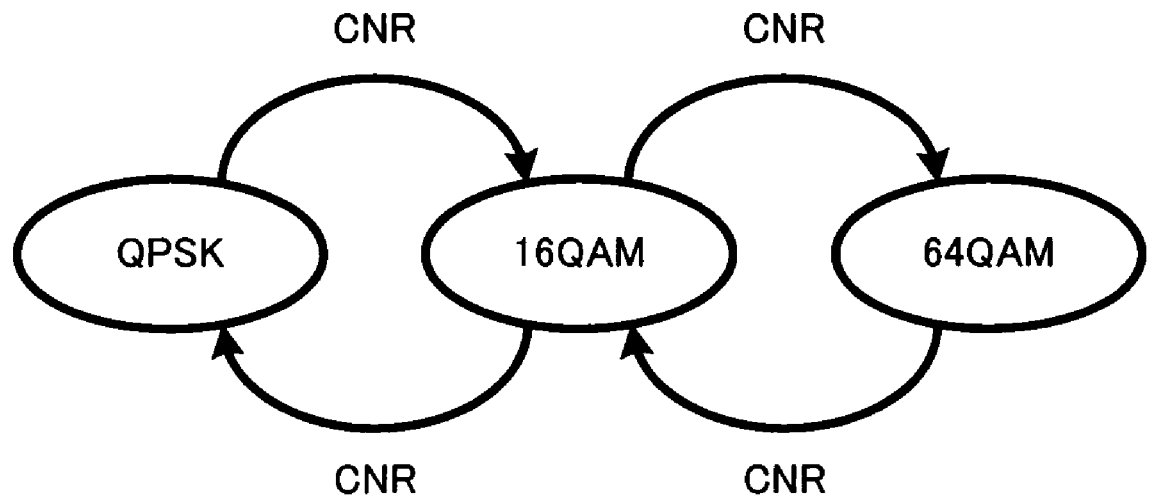
FIG. 11A is a transition view showing parameters for use in determination to switch between modulation schemes in Embodiment 2 of the present invention.
Figure 11B:
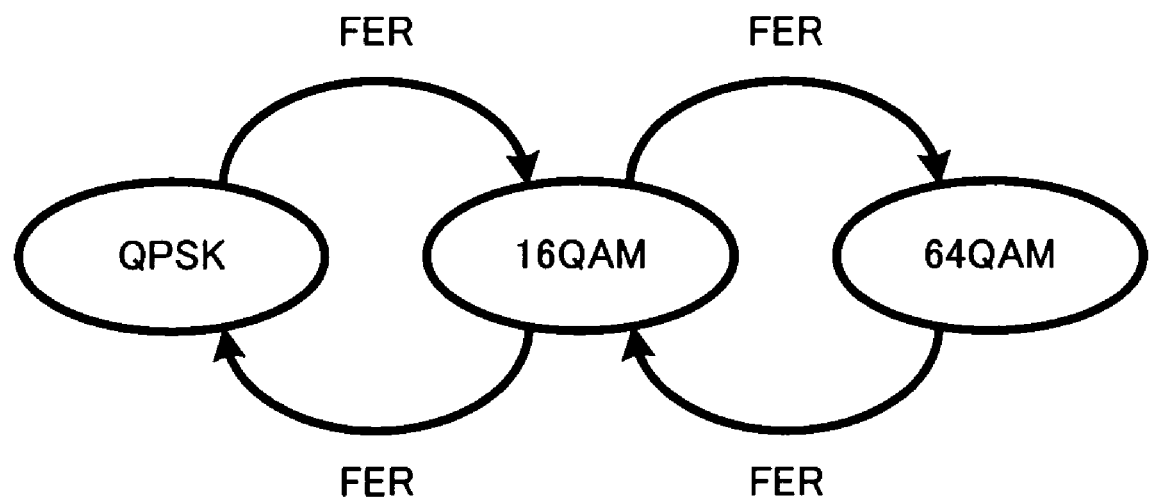
FIG. 11B is another transition view showing parameters for use in determination to switch between modulation schemes in Embodiment 2 of the present invention.

In other words, the FER counts errors as one frame error regardless of the number of errors occurring in the frame, and has a characteristic of being less subject to the influence of the fading pitch and synchronization error. To be more specific, when the fading pitch is lower than a predetermined threshold ths_f, as shown in FIG. 11A, the CNR is selected as a parameter of communication quality. Inversely, when the fading pitch is higher than the predetermined threshold ths_f, as shown in FIG. 11B, the FER is selected as a parameter of communication quality.

Based on the IQ vector signal outputted from quadrature demodulation section 811 in reception processing section 801, CNR estimation section 232 estimates the CNR of the received signal in downlink, and outputs the estimated CNR value to switching section 823.

Based on the error detection result per frame outputted from error detection section 813 in reception processing section 801, FER estimation section 822 estimates the FER and outputs the estimated FER value to switching section 823. As a method of estimating the FER, for example, when an error occurs in a frame, the number of error frames f_err is counted, and the total number of reception frames f_all is counted, and FER estimation value s26 is estimated from equation (5).

[Equation 5]

$$s26 = \frac{f\_err}{f\_all} \tag{5}$$

Switching section 823 receives the parameter information outputted from communication quality selection section 821, selects the parameter indicating the communication quality indicated by the parameter information, and outputs the estimation result (selection estimation result) by the selected parameter to average processing section 825.

Average processing section 825 performs average processing on the selection estimation result outputted from switching section 823 using the past N frames of selection estimation values based on the predetermined number N, and outputs average estimation value s13 that is an average value of selection estimation values to transmission processing section 202. To be more specific, average estimation value s13 is calculated by equation (6).

[Equation 6]

$$s13 = \frac{1}{N} \sum_{i=t}^{t-(N-1)} s27(i) \tag{6}$$

Transmission processing section 202 performs predetermined transmission processing on the parameter information outputted from communication quality selection section 821 and the average estimation value outputted from average processing section 825, outputs the transmission signal, and thereby reports the parameter used as the communication quality of downlink and the average estimation value to first communication apparatus 700. The predetermined transmission processing includes, for example, frequency conversion processing, amplification processing and the like.

The case will specifically be described below where based on the parameter information and the like transmitted from second communication apparatus 800, first communication apparatus 700 switches between three modulation schemes, QPSK, 16QAM and 64QAM.

Figure 10:
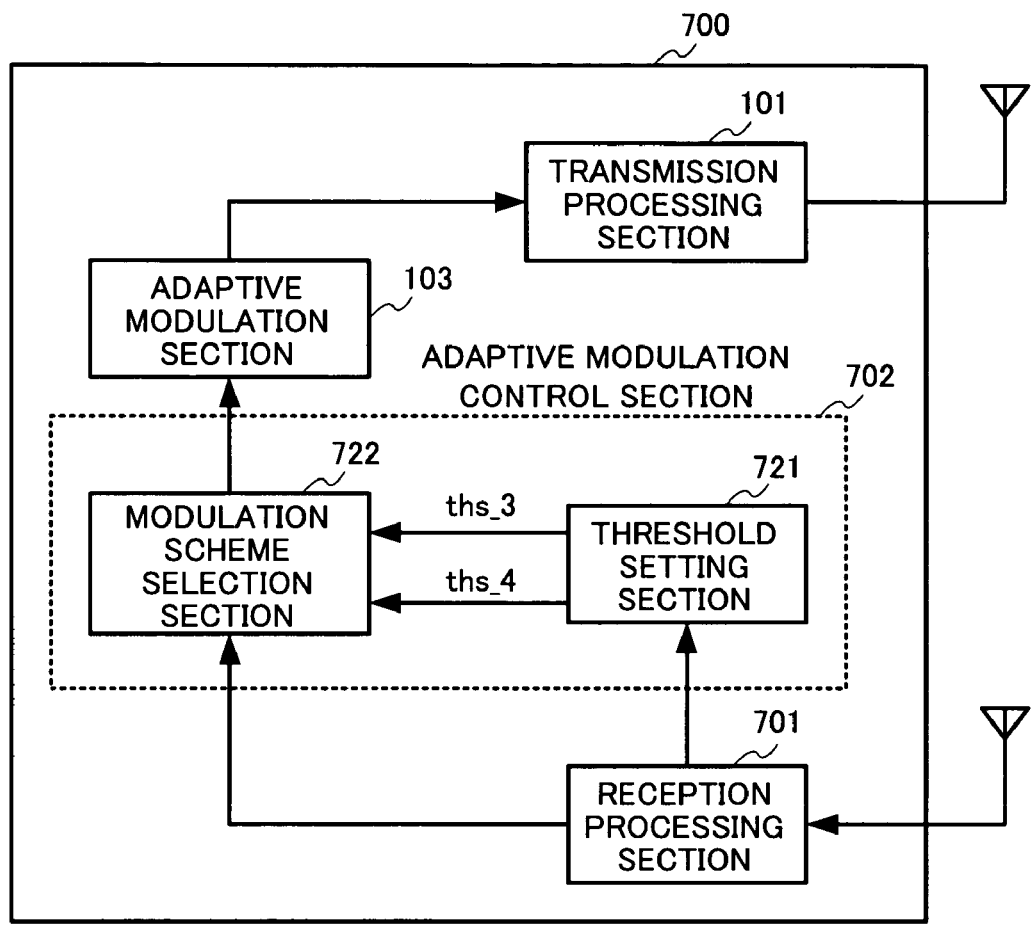
FIG. 10 is a block diagram illustrating configuration of the first communication apparatus according to Embodiment 2 of the present invention.

FIG. 10 is a block diagram illustrating a configuration of first communication apparatus 700 according to Embodiment 2 of the present invention. In FIG. 10, reception processing section 701 receives a signal transmitted from second communication apparatus 800, and performs frequency conversion, quadrature demodulation processing, synchronization processing and the like on the received signal. Then, reception processing section 701 extracts the parameter information used in estimation of the communication quality of downlink and the average estimation value of the parameter from the received signal, and outputs the parameter information to threshold setting section 721 and the average estimation value to modulation scheme selection section 722. Herein, it is assumed that the parameter information indicates the FER.

Adaptive modulation control section 702 sets a determination threshold for use in determination to switch between modulation schemes according to the parameter information, compares the average estimation value with the determination threshold, and thereby selects a modulation scheme for use in downlink by first communication apparatus 700, and outputs modulation scheme information indicating the selected modulation scheme to adaptive modulation section 103.

Threshold setting section 721 sets determination thresholds ths_3 and ths_4 for use in determination to switch between modulation schemes according to the parameter information to output to modulation scheme selection section 722. Herein, ths_3 is a determination threshold for use in determination to switch to a modulation scheme which has a smaller M-ary number than a currently used modulation scheme, and ths_4 is a determination threshold for use in determination to switch to a modulation scheme which has a larger M-ary number than a currently used modulation scheme. For example, ths_3 is set at 0.5, and ths_4 is set at 0.1 (ths_3=0.5, ths_4=0.1).

Modulation scheme selection section 722 compares the average estimation value with sizes of determination thresholds ths_3 and ths_4, and thereby selects a modulation scheme for use in downlink. To be more specific, modulation scheme selection section 722 selects a modulation scheme which has a smaller M-ary number than a currently used modulation scheme when the average estimation value s19 satisfies equation (7). For example, QPSK is selected when the current modulation scheme is 16QAM, and 16QAM is selected when the current modulation scheme is 64QAM. In addition, when the currently used modulation scheme is a scheme (QPSK in this Embodiment) which has the smallest M-ary number among selectable modulation schemes, since it is impossible to select a scheme which has a smaller M-ary number than the current modulation scheme, the current modulation scheme is continuously selected. When equation (8) is satisfied, a modulation scheme being used at this point is selected continuously. Further, when equation (9) is satisfied, a modulation scheme which has a larger M-ary number than a currently used modulation scheme is selected. For example, 64QAM is selected when the current-modulation scheme is 16QAM, while 16QAM is selected when the current modulation scheme is QPSK. In addition, when the currently used modulation scheme is a scheme (64QAM in this Embodiment) with the largest M-ary number among selectable modulation schemes, since it is impossible to select a scheme which has a larger M-ary number than the current modulation scheme, the current modulation scheme is continuously selected.

[Equation. 7]

$$s19 \leq ths\_3 \quad (7)$$

[Equation. 8]

$$ths\_3 < s19 \leq ths\_4 \quad (8)$$

[Equation. 9]

$$ths\_4 < s19 \quad (9)$$

Thus, according to Embodiment 2, the second communication apparatus selects a method of estimating communication quality based on the change in the propagation path condition and reports the communication quality estimated by the method of estimating communication quality to the first communication apparatus, and the first communication apparatus selects a modulation scheme based on the communication quality. It is thereby possible to select the modulation scheme more suitable for the propagation path condition so that the transmission efficiency can be improved.

In addition, in this Embodiment, pseudo error detection section 222 is configured to calculate the number of pseudo bit errors per block, but this is by no means limiting, and, for example, pseudo error detection section 222 may be configured to calculate a pseudo bit error rate per block, or may be configured to calculate an actual bit error rate, a CNR or the like. Further, an estimated fading pitch is used as a parameter indicating the propagation path condition, but this is by no means limiting, and, for example, delay spread may be used.

Further, in this Embodiment, reception processing section 801 is configured to perform coherent detection, but this is by no means limiting, and, reception processing section 801 is only required to enable demodulation of the received signal, and, for example, may be configured to perform delay detection, instead of coherent detection.

Furthermore, in this Embodiment, in FIG. 9, threshold setting section 721 is configured to set a threshold for the FER. However, when communication quality selection section 821 selects the CNR as a parameter of communication quality, threshold setting section 721 can be configured to set a threshold corresponding to the CNR, and modulation scheme selection section 722 can substitute the CNR in a determination method for switching between modulation schemes. Also when another parameter is selected, the operation is carried out in the same way as in the foregoing.

Figure 12:
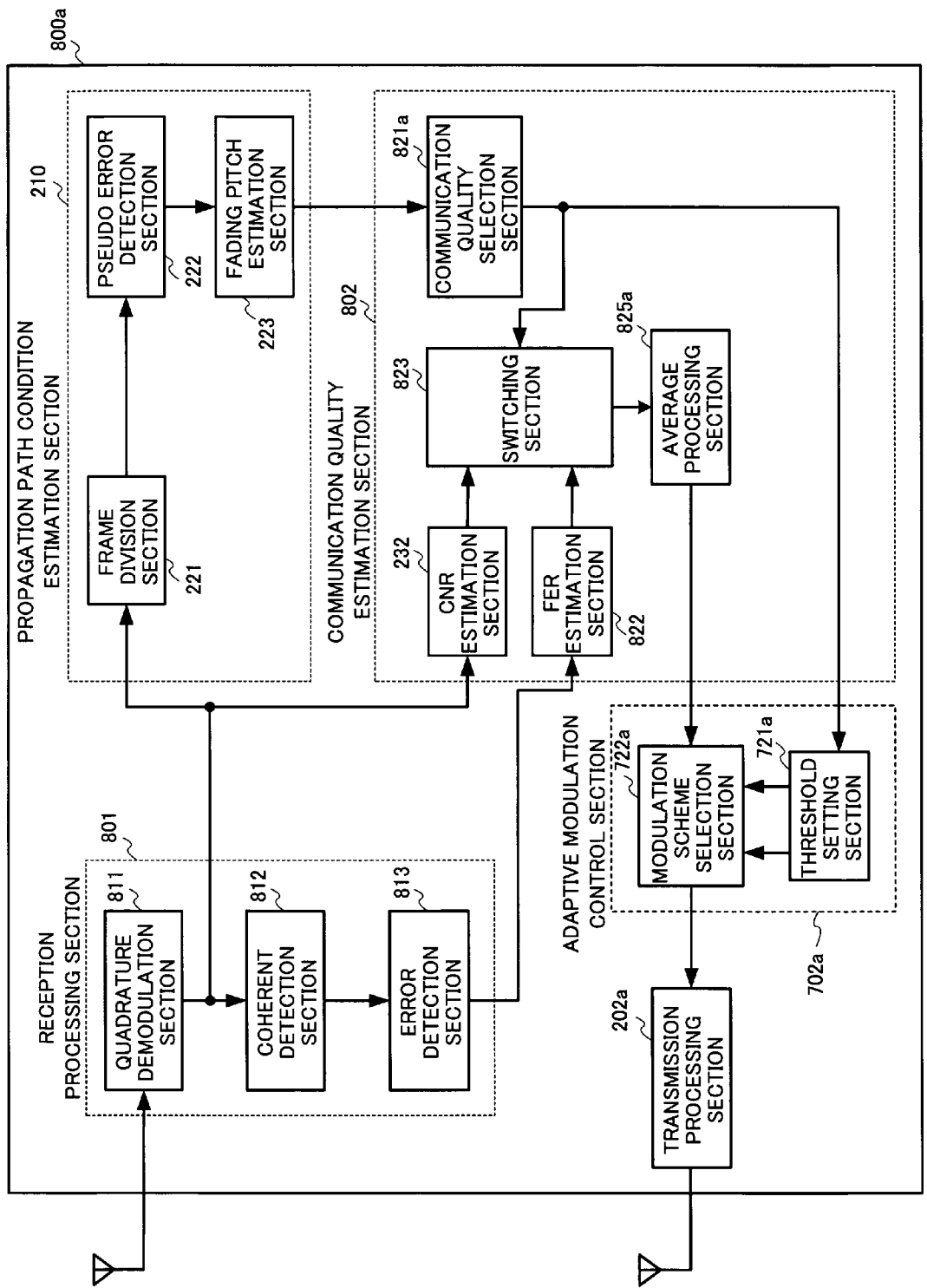
FIG. 12 is a block diagram illustrating another configuration of the second communication apparatus according to Embodiment 2 of the present invention.

Still furthermore, in this Embodiment, first communication apparatus 700 is configured to make a determination to switch between modulation schemes, but this is by no means limiting, and adaptive modulation control section 702 of first communication apparatus 700 may be disposed in second communication apparatus 800. FIG. 12 shows a configuration of second communication apparatus 800a in this case.

As shown in FIG. 12, the average estimation value outputted from average processing section 825a may be inputted to modulation scheme selection section 722a in adaptive modulation control section 702a, and the parameter information outputted from communication quality selection section 821a may be inputted to threshold setting section 721a.

In such a configuration, threshold setting section 721a sets determination thresholds for use in determination to switch between modulation schemes according to the parameter information and outputs it to modulation scheme selection section 722a. Modulation scheme selection section 722a compares the average estimation value inputted from average processing section 825a with the thresholds inputted from threshold setting section 721a, and thereby selects a modulation scheme. Then, modulation scheme selection section 722a outputs the modulation scheme information indicating the selected modulation scheme to transmission processing section 202a, and transmission processing section 202a transmits the modulation scheme information to first communication apparatus 700a.

First communication apparatus 700a has the same configuration as the configuration as shown in FIG. 8, and operates in the same way as described in Embodiment 1. By this means, in uplink, even when an amount of information that can be transmitted is small, and a large amount of information such as a communication quality estimation value cannot be transmitted, adaptive modulation can be performed.

Further, this Embodiment can be implemented by combining with Embodiment 1. Furthermore, this Embodiment can be implemented by a program.

Embodiment 3

Embodiment 3 of the present invention describes a case where the condition of a downlink propagation path is estimated, and according to the estimation result, threshold setting section 1021 sets a determination threshold for use in determination to switch between modulation schemes. In addition, in this Embodiment, a communication path from first communication apparatus 1000 to second communication apparatus 1100 is referred to as downlink, and a communication path from second communication apparatus 1100 to first communication apparatus 1000 is referred to as uplink.

Figure 13:
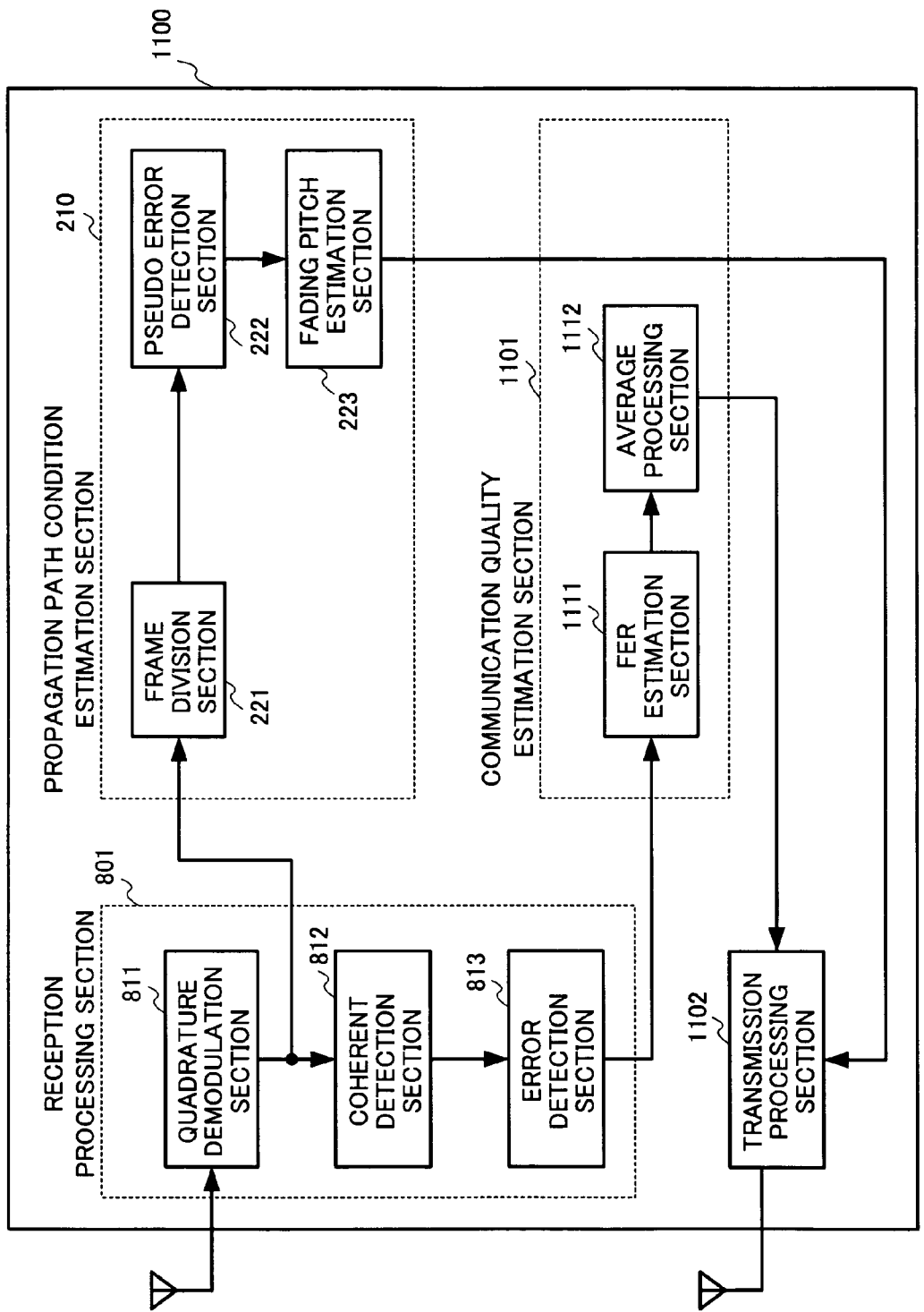
FIG. 13 is a block diagram illustrating a configuration of a second communication apparatus according to Embodiment 3 of the present invention.

FIG. 13 is a block diagram illustrating a configuration of second communication apparatus 1100 according to Embodiment 3 of the present invention. In addition, it is assumed that data is transmitted on a predetermined frame basis in downlink. In FIG. 13, communication quality estimation section 1101 estimates communication quality in downlink from an error detection result outputted from error detection section 813 in reception processing section 801, and outputs an estimation result of communication quality to transmission processing section 1102. The parameter indicating the communication quality includes a BER, FER, CNR, and the like, and in this Embodiment, the FER is used.

Based on an error detection result outputted from error detection section 813 in reception processing section 801, FER estimation section 1111 estimates the FER and outputs the FER estimation value to average processing section 1112.

Average processing section 1112 averages the FER estimation value outputted from FER estimation section 1111, and outputs the averaged FER estimation value (average estimation value s19) to transmission processing section 1102.

Transmission processing section 1102 performs predetermined transmission processing on the fading pitch outputted from fading pitch estimation section 223 and average estimation value s19 outputted from average processing section 1112 in communication quality estimation section 1101, outputs the transmission signal, and thereby reports the propagation path condition and the communication quality of downlink to first communication apparatus 1000. The predetermined transmission processing includes, for example, frequency conversion processing and amplification processing.

The case will specifically be described below where, based on the parameter information and the like transmitted from second communication apparatus 1100, first communication apparatus 1000 switches between three modulation schemes, QPSK, 16QAM and 64QAM.

Figure 14:
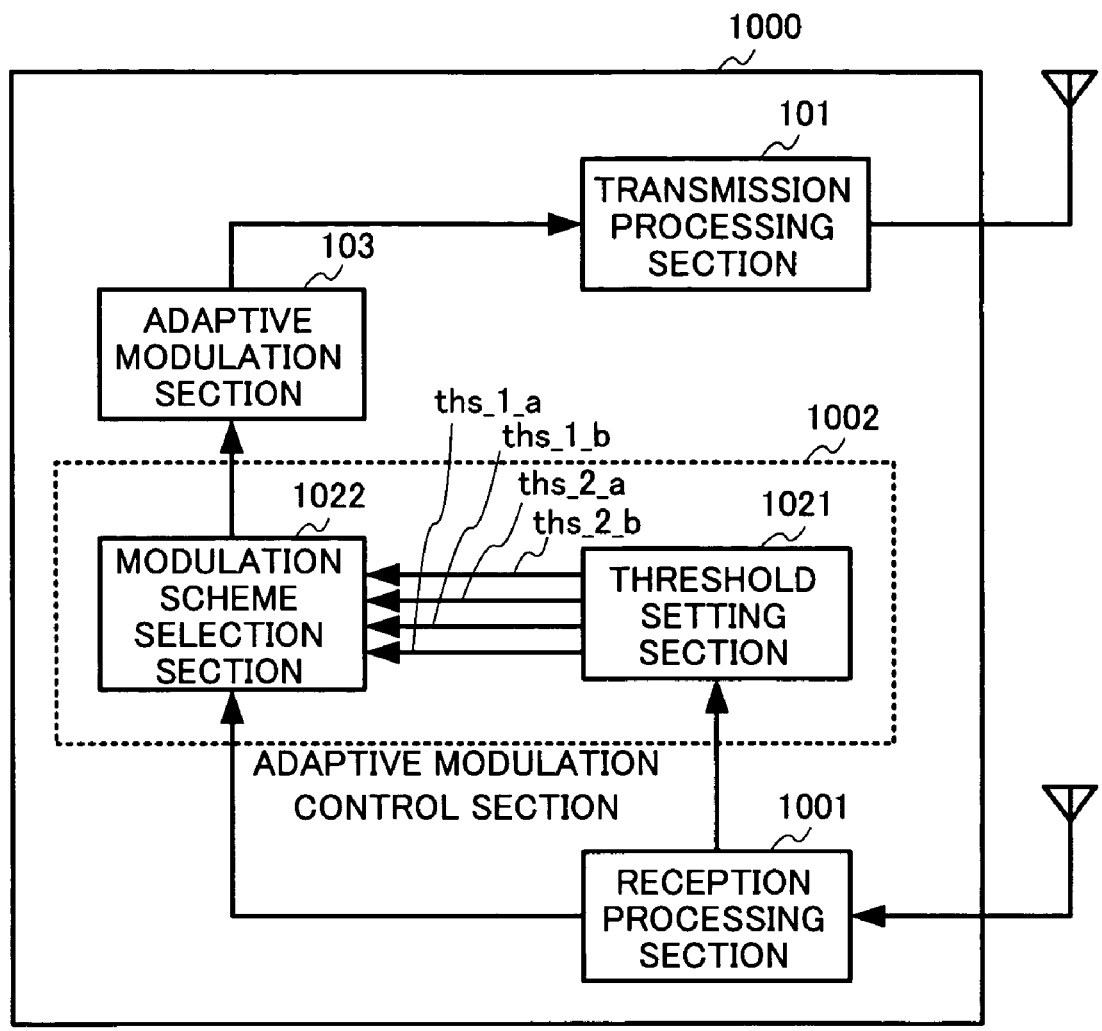
FIG. 14 is a block diagram illustrating a configuration of a first communication apparatus according to Embodiment 3 of the present invention.

FIG. 14 is a block diagram illustrating a configuration of first communication apparatus 1000 according to Embodiment 3 of the present invention. In FIG. 14, reception processing section 1001 receives a signal transmitted from second communication apparatus 1100, and performs frequency conversion, quadrature demodulation processing, synchronization processing and the like on the received signal. Then, reception processing section 1101 extracts average estimation value s19 of the communication quality in downlink and the fading pitch indicating the propagation path condition from the received signal, and outputs average estimation value s19 to modulation scheme selection section 1022, and the fading pitch to threshold setting section 1021.

Adaptive modulation control section 1002 sets a determination threshold for use in determination to switch between modulation schemes according to the fading pitch, compares average estimation value s19 with determination threshold, thereby selects a modulation scheme for use in downlink by first communication apparatus 1000, and outputs modulation scheme information indicating the selected modulation scheme to adaptive modulation section 103.

Based on the fading pitch outputted from reception processing section 1001, threshold setting section 1021 sets determination thresholds ths_1_a, ths_1_b, ths_2_b, and ths_2_a for use in determination to switch between modulation schemes to output to modulation scheme selection section 1022.

Figure 15:
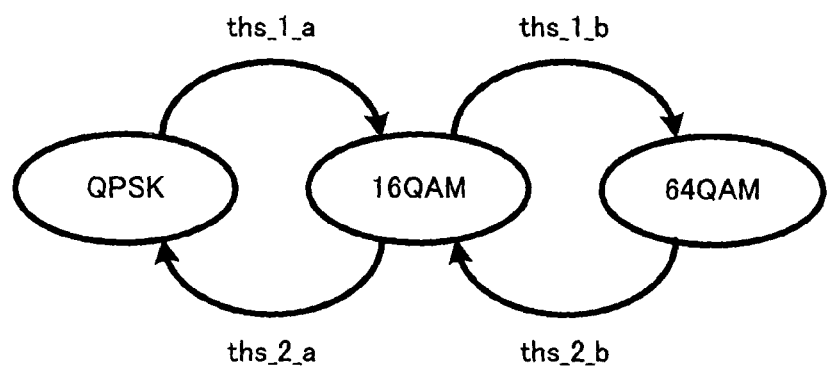
FIG. 15 is a transition view showing parameters for use in determination to switch between modulation schemes in Embodiment 3 of the present invention.

As shown in FIG. 15, ths_1_a is a determination threshold for use in determination to switch from QPSK to 16QAM, and ths_1_b is a determination threshold for use in determination to switch from 16QAM to 64QAM. Further, ths_2_a is a determination threshold for use in determination to switch from 16QAM to QPSK, and ths_2_b is a determination threshold for use in determination to switch from 64QAM to 16QAM.

Figure 16:
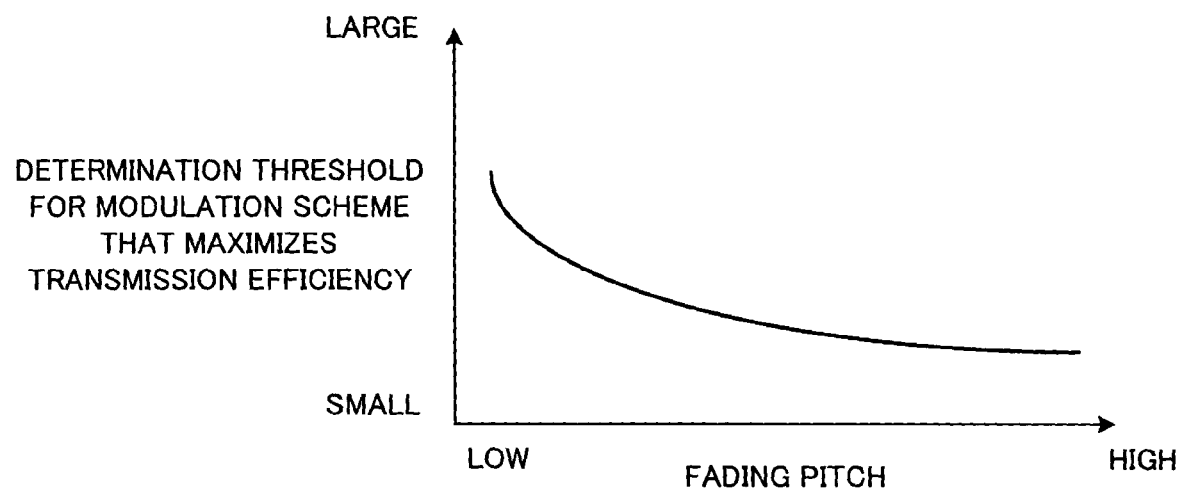
FIG. 16 is a graph showing the relationship between the fading pitch and frame error rate.

To be more specific, when the FER is used as an index for use in determination to switch between modulation schemes, as shown in FIG. 16, a determination threshold for a modulation scheme that maximizes the transmission efficiency tends to decrease as the fading pitch is higher, and inversely, the determination threshold tends to increase in accordance with a decrease of the fading pitch. Accordingly, threshold setting section 1021 makes a determination threshold when the fading pitch is high, smaller than a determination threshold when the fading pitch is low. This is equivalent to making it harder to switch to a high-speed modulation scheme in accordance with an increase of the speed of the change in the propagation path condition. For example, threshold setting section 1021 beforehand prepares this characteristic as a table, refers to the table according to a value of the fading pitch, and sets a threshold.

Modulation scheme selection section 1022 receives average estimation value s19 outputted from reception processing section 1001 and determination thresholds ths_1_a, ths_1_b, ths_2_b and ths_2_a outputted from threshold setting section 1021, compares threshold estimation value s19 with sizes of determination thresholds ths_1_a, ths_1_b, ths_2_b and ths_2_a, and thereby selects a modulation scheme for use in downlink by first communication apparatus 1000. To be more specific, modulation scheme selection section 1022 selects QPSK when average estimation value s19 satisfies equation (10) or equation (11), 16QAM when average estimation value s19 satisfies equation (12) or equation (13), or 64QAM when average estimation value s19 satisfies equation (14) or equation (15). Then, modulation scheme selection section 1022 outputs modulation scheme information indicating the selected modulation scheme to adaptive modulation section 103.

[Equation. 10]
$$s19 \leq ths\_1\_a \tag{10}$$

[Equation. 11]
$$s19 \leq ths\_1\_b \tag{11}$$

[Equation. 12]
$$ths\_1\_a \leq s19 \leq ths\_2\_a \tag{12}$$

[Equation. 13]
$$ths\_1\_b \leq s19 \leq ths\_2\_b \tag{13}$$

[Equation. 14]
$$ths\_2\_a \leq s19 \tag{14}$$

[Equation. 15]
$$ths\_2\_b \leq s19 \tag{15}$$

Threshold setting section 1021 sets these thresholds ths_1_a, ths_1_b, ths_2_b and ths_2_a according to the fading pitch.

Thus, according to Embodiment 3, by estimating the speed of the change in the propagation path condition, setting determination thresholds for use in determination to switch between modulation schemes according to the speed of the change in the propagation path condition, and selecting a modulation scheme based on a comparison result between the determination threshold and an estimation value of downlink communication quality, it is possible to select a modulation scheme more suitable for the propagation path condition, so that the transmission efficiency can be improved.

In addition, a unit of frame used in communication is not particularly limited, and, for example, when communication is performed on a time-slot basis by time division multiplexing scheme, a unit may be a single time slot or a frame formed with a plurality of time slots.

Further, in this Embodiment, propagation path condition estimation section 210 is configured to calculate the number of pseudo bit errors on a signal per block, but this is by no means limiting, and, for example, propagation path condition estimation section 210 may be configured to calculate a pseudo bit error rate per block, or may be configured to calculate an actual bit error rate, CNR or the like. Further, an index representing the condition of propagation path is the fading pitch, but this is by no means limiting, and, for example, delay spread may be used.

Figure 17:
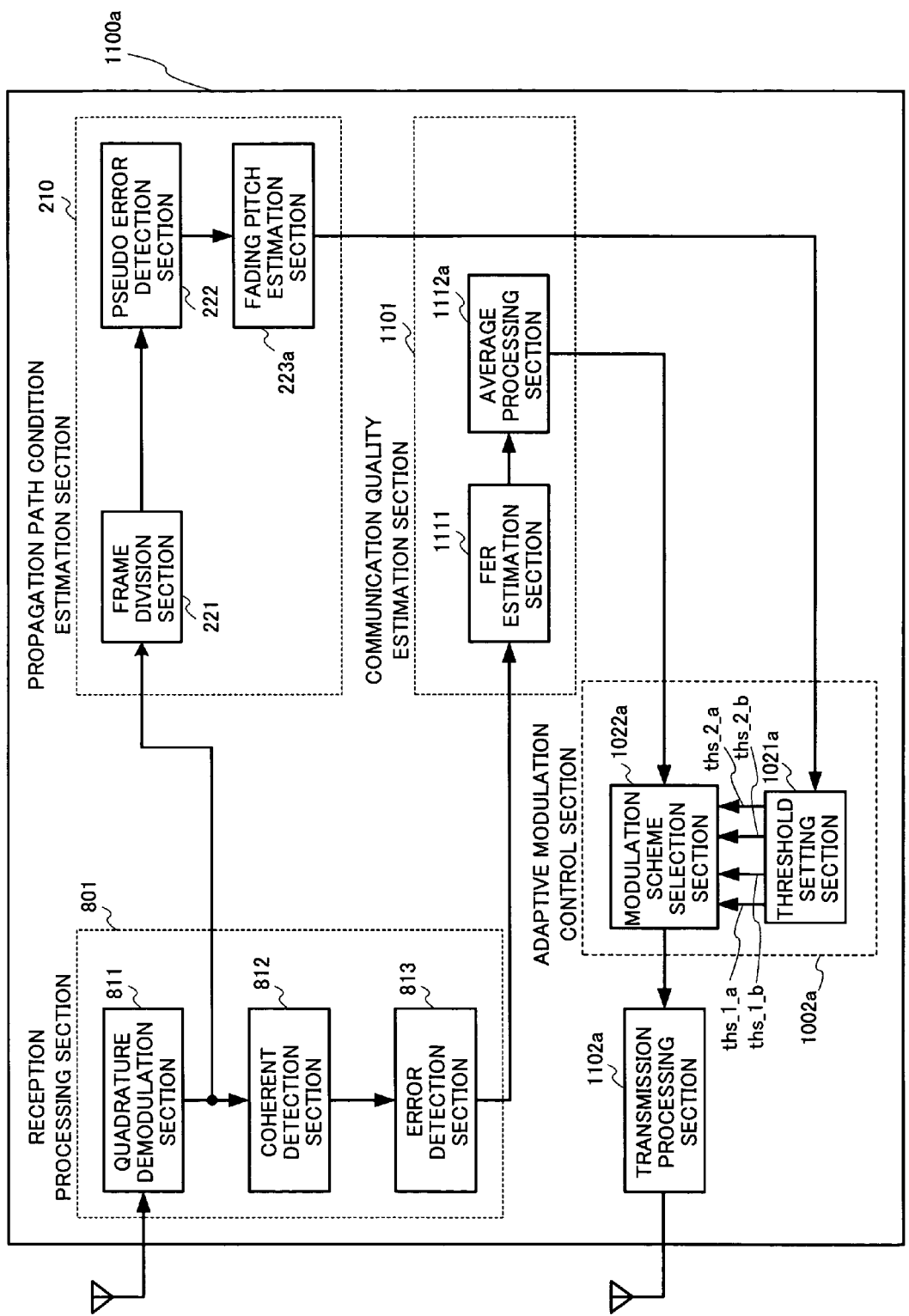
FIG. 17 is a block diagram illustrating another configuration of the second communication apparatus according to Embodiment 3 of the present invention.

Moreover, in this Embodiment, first communication apparatus 1000 is configured to make a determination to switch between modulation schemes, but this is by no means limiting, and adaptive modulation control section 1002 of the first communication apparatus may be disposed in the second communication apparatus. FIG. 17 shows a configuration of second communication apparatus 1100a in this case.

As shown in FIG. 17, it is only necessary to have a configuration in which the average estimation value outputted from average processing section 1112a is inputted to modulation scheme selection section 1022a in adaptive modulation control section 1002a, and the fading pitch outputted from fading pitch estimation section 223a is inputted to threshold setting section 1021a.

In such a configuration, threshold setting section 1021a sets determination thresholds for use in determination to switch between modulation schemes according to the fading pitch to output to modulation scheme selection section 1022a. Modulation scheme selection section 1022a compares the average estimation value inputted from average processing section 1112a with sizes of the thresholds inputted from threshold setting section 1021a, and selects a modulation scheme. Then, modulation scheme selection section 1022a outputs modulation scheme information indicating the selected modulation scheme to transmission processing section 1102a, and transmission processing section 1102a transmits the modulation scheme information to first communication apparatus 1000a.

First communication apparatus 1000a has the same configuration as the configuration as shown in FIG. 8, and operates in the same way as described in Embodiment 1. By this means, in uplink, even when an amount of information that can be transmitted is small, and a large amount of information such as a communication quality estimation value cannot be transmitted, adaptive modulation can be performed.

Further, this Embodiment can be implemented by combining with Embodiment 1 or Embodiment 2. Furthermore, this Embodiment can be implemented by program.

Other Embodiments

Above-mentioned Embodiments 1 to 3 describe the case where, when communication is performed using single-carrier modulation signals, the speed of the change in a propagation path condition is estimated, and a switching control scheme for modulation schemes is selected based on an estimation result, but the present invention is not limited to this.

For example, the present invention is applicable to the case where communication is performed using multicarrier signals, instead of single-carrier modulation signals, where adaptive modulation is performed in QPSK or M-ary QAM as primary modulation, and as secondary modulation, for example, an orthogonal frequency division multiplexing (OFDM) scheme is performed.

As a switching control method for the multicarrier signal, for example, a propagation path condition estimation section estimates the propagation path condition per subcarrier, and it is thereby possible to estimate whether frequency selective fading occurs on the propagation path.

To be more specific, under circumstances where drops in reception power per frequency component due to fading occur frequently in a band of the multicarrier signal, the circumstances can be estimated as an environment where a multipath with equivalently large delay spread exists, and it is possible to change the control method according to the estimated propagation path condition.

As an example of a change of the control method, for example, as in Embodiment 1, the number of frames for use in estimation of communication quality is set according to the propagation path condition.

More specifically, under circumstances where a large number of drops occur in reception power per frequency component, the number of frames for use in estimation of communication quality may be controlled to increase, and inversely, the number of frames for use in estimation of communication quality may be controlled to decrease when a small number of drops occur in reception power per frequency component. Otherwise, in the case of a system where adaptive modulation is controlled independently of each subcarrier, control is performed separately on subcarriers with drops in reception power and other subcarriers without drops, and particularly, control may be performed to change the above-mentioned number of frames.

Further, as in Embodiment 2, a parameter indicating communication quality to be a criterion for switching between modulation schemes may be selected.

Furthermore, as in Embodiment 3, a determination threshold for use in determination to switch between modulation schemes may be set based on an estimation result of the propagation path condition. More specifically, when a large number of drops occur in reception power per frequency component, a determination threshold is set so that a modulation scheme which has a smaller M-ary number is selected, and inversely, when a small number of drops occur in reception power per frequency component, a determination threshold is set so that a modulation scheme which has a larger M-ary number is selected.

In the operation as described above, when communication is performed using the multicarrier signal, it is possible to obtain the same influences as in Embodiments 1 to 3.

Further, the inventions as described in Embodiments 1 to 3 are applicable to a signal subjected to code division multiplexing by spread spectrum as secondary modulation. At this point, when a signal subjected to despreading is configured on a predetermined frame basis, by substituting the signal subjected to despreading for IQ vector signal s4 as described in Embodiments 1 to 3, it is possible to obtain the same influences as in Embodiments 1 to 3.

Furthermore, the present invention is applicable to a signal subjected to frequency hopping processing as secondary modulation.

Moreover, the present invention is not limited to the above-mentioned Embodiments, and can be implemented with various modifications. For example, the above-mentioned Embodiments describe the case where the present invention is implemented as a communication apparatus, but this is by no means limiting, and the communication method can be implemented as software.

For example, a program for executing the above-mentioned communication method may be stored beforehand in a ROM (Read Only Memory) and may be operated by a CPU (Central Processor Unit).

Further, a program for executing the above-mentioned communication method may be stored in a computer readable storage medium, the program stored in the storage medium may be recorded in a RAM (Random Access Memory) of a computer, and the computer may be operated according to the program.

A first aspect of present invention is a communication apparatus having: a propagation path condition estimator that estimates speed of a change in a propagation path condition;

a communication quality estimator that changes a method of estimating the communication quality based on the speed of the change in the propagation path condition and estimates communication quality; a transmitter that transmits the communication quality estimated in the communication quality estimator to a communicating party; a receiver that receives data modulated in a modulation scheme determined based on the communication quality by the communicating party; and a demodulator that demodulates the data.

A second aspect of present invention is a communication apparatus having: a propagation path condition estimator that estimates speed of a change in a propagation path condition; a communication quality estimator that changes an estimation method based on the speed of the change in the propagation path condition and estimates communication quality; a threshold setter that sets a criterion to select a modulation scheme for use in communication with a communicating party from a plurality of modulation schemes based on information of the speed of the change in the propagation path condition; a modulation scheme selector that selects a modulation scheme from the communication quality by the criterion set by the threshold setter; and a transmitter that transmits information indicating the selected modulation scheme to the communicating party.

A third aspect of the present invention is a communication apparatus in the above-mentioned aspect wherein the communication quality estimator makes the length of the term for averaging the communication quality when the change in the propagation path condition is fast longer than the length of the term for averaging the communication quality when the change in the propagation path condition is slow, and averages the information of the communication quality to estimate.

According to these configurations, by estimating the speed of a change in a propagation path condition of a received signal, and changing a method for estimating communication quality according to the speed of the change in the propagation path condition, it is possible to select a modulation scheme more suitable for the propagation path condition so that the transmission efficiency can be improved.

A fourth aspect of the present invention is a communication apparatus in the above-mentioned aspect wherein the communication quality estimator estimates the communication quality by a plurality of estimation methods, and selects the communication quality estimated by one of the plurality of estimation methods based on the speed of the change in the propagation path condition.

According to this configuration, a receiving side selects an estimation method for the communication quality based on the change in the propagation path condition, and reports the communication quality estimated by the selected estimation method to a transmitting side. The transmitting side selects one of a plurality of modulation schemes based on the communication quality, and transmits a signal in the selected modulation scheme. It is thereby possible to select the modulation scheme more suitable for the propagation path condition so that transmission efficiency can be improved.

A fifth aspect of the present invention is a communication apparatus in the above-mentioned aspect wherein the communication quality estimator estimates the communication quality by a plurality of estimation methods, and an estimation method to be selected when the speed of the change in the propagation path condition is faster than a predetermined threshold, estimates a longer length of the term than an estimation method to be selected when the speed of the change in the propagation path condition is slower than the predetermined threshold.

A sixth aspect of the present invention is a communication apparatus in the above-mentioned aspect wherein the communication quality estimator estimates the communication quality by a plurality of estimation methods, and estimates a frame error rate when the speed of the change in the propagation path condition is faster than a predetermined threshold, while estimating a received power to noise ratio when the speed of the change in the propagation path condition is slower than the predetermined threshold.

According to these configurations, by estimating the speed of the change in the propagation path condition of a received signal, changing a determination criterion for switching between modulation schemes according to the speed of the change in the propagation path condition, selecting a modulation scheme based on the communication quality, and transmitting data in the selected modulation scheme, it is possible to improve the transmission efficiency.

A seventh aspect of the present invention is a communication apparatus having: a receiver that receives information of speed of a change in a propagation path condition estimated by a communicating party; a threshold setter that sets a criterion to select a modulation scheme of a signal to be transmitted to the communicating party from a plurality of modulation schemes based on the information of the speed of the change in the propagation path condition; a modulation scheme selector that selects a modulation scheme based on the criterion set by the threshold setter and reception quality of a signal received in the communicating party; an adaptive modulator that modulates data in the modulation scheme selected in the modulation scheme selector; and a transmitter that transmits the modulated data by a radio signal.

An eighth aspect of the present invention is a communication apparatus in the above-mentioned aspect wherein the threshold setter sets the criterion so that the modulation scheme is harder to be switched in a threshold when the speed of the change in the propagation path condition is fast than in a threshold when the speed of the change in the propagation path condition is slow.

According to these configurations, by estimating the speed of the change in the propagation path condition of a received signal, and changing a method of estimating communication quality according to the speed of the change in the propagation path condition, it is possible to select a modulation scheme more suitable for the propagation path condition so that the transmission efficiency can be improved.

A ninth aspect of the present invention is a communication apparatus in the above-mentioned aspect wherein the propagation path estimator divides the received signal into predetermined data sizes, detects fluctuation in reception quality on a basis of divided data, and thereby estimates the speed of the change in the propagation path condition.

According to this configuration, even under a communication environment where the propagation path changes within a single frame, it is possible to appropriately estimate the speed of the change in the propagation path condition and therefore select a modulation scheme more suitable for the propagation path condition so that the transmission efficiency can be improved.

A tenth aspect of the present invention is a communication method wherein: a receiving side estimates speed of a change in a propagation path condition, changes a method of estimating communication quality based on the speed of the change in the propagation path condition, estimates communication quality, and transmits information of the estimated communication quality and information of the speed of the change in the propagation path condition to a transmitting side; the transmitting side receives the information of the communication quality and the information of the speed of the change in the propagation path condition transmitted from the receiving side, sets a criterion to select a modulation scheme of a signal to be transmitted to the receiving side from a plurality of modulation schemes based on the information of the speed of the change in the propagation path condition, selects the modulation scheme based on the set criterion and the communication quality of a signal received at the receiving side, modulates data in the selected modulation scheme, and transmits the modulated data by a radio signal; and the receiving side receives the data modulated in the modulation scheme determined by the transmitting side, and demodulates the data.

An eleventh aspect of the present invention is a communication method wherein: a receiving side estimates speed of a change in a propagation path condition, estimates communication quality, changing an estimation method based on the speed of the change in the propagation path condition, sets a criterion to select a modulation scheme of a signal for a transmitting side to be transmitted to the receiving side from a plurality of modulation schemes based on the speed of the change in the propagation path condition, selects a modulation scheme from the communication quality of a received signal by the set criterion, and transmits information indicating the selected modulation scheme to the transmitting side; the transmitting side receives the information indicating the modulation scheme selected at the receiving side, modulates data in the selected modulation scheme, and transmits the modulated data by a radio signal; and the receiving side receives the data modulated by the transmitting side in the selected modulation scheme, and demodulates the data.

According to these configurations, by estimating the speed of the change in the propagation path condition of a received signal, and changing a method of measuring communication quality according to the speed of the change in the propagation path condition, it is possible to select a modulation scheme more suitable for the propagation path condition so that the transmission efficiency can be improved.

The present application is based on Japanese Patent Applications No. 2004-096569 filed on Mar. 29, 2004, and No. 2005-077580 filed on Mar. 17, 2005, the entire contents of which are expressly incorporated by reference herein.

INDUSTRIAL APPLICABILITY

The present invention is suitable for use in a communication apparatus and communication method in a communication system where modulation schemes are adaptively changed according to the communication quality of a propagation path.

The invention claimed is:

1. A communication apparatus comprising:
   a propagation path condition estimation section that estimates a speed of a change in a propagation path condition;
   a communication quality estimation section that changes a method of estimating a communication quality of a received signal, based on the estimated speed of the change in the propagation path condition, and estimates the communication quality;
   a transmission section that transmits the estimated communication quality to a communicating party;
   a reception section that receives data modulated in a modulation scheme determined by the communicating party based on the estimated communication quality; and
   a demodulation section that demodulates the received data, wherein:
   one of a fading pitch, a delay profile, and a fluctuation period of received signal power is used as a parameter indicating the estimated speed of the change in the propagation path condition; and
   the communication quality estimation section provides a longer first length of a first term for averaging the communication quality when a first estimated speed of the change in the propagation path condition is fast, and provides a second length of a second term for averaging the communication quality that is shorter than the first length when a second estimated speed of the change in the propagation path condition is slower than the first estimated speed of the change in the propagation condition, and averages information of the communication quality for the longer first length and the shorter second length to estimate the communication quality.

2. A communication apparatus comprising:
   a propagation path condition estimation section that estimates a speed of a change in a propagation path condition;
   a communication quality estimation section that changes a method of estimating a communication quality of a received signal, based on the estimated speed of the change in the propagation path condition, and estimates the communication quality;
   a threshold setting section that sets a criterion for selecting, from a plurality of modulation schemes, a modulation scheme for use in communication with a communicating party, based on the estimated speed of the change in the propagation path condition;
   a modulation scheme selection section that selects the modulation scheme based on the estimated communication quality and the set criterion; and
   a transmission section that transmits information of the selected modulation scheme to the communicating party, wherein:
   one of a fading pitch, a delay profile, and a fluctuation period of received signal power is used as a parameter indicating the estimated speed of the change in the propagation path condition; and
   the communication quality estimation section provides a longer first length of a first term for averaging the communication quality when a first estimated speed of the change in the propagation path condition is fast, and provides a second length of a second term for averaging the communication quality that is shorter than the first length when a second estimated speed of the change in the propagation path condition is slower than the first estimated speed of the change in the propagation condition, and averages information of the communication quality for the longer first length and the shorter second length to estimate the communication quality.

3. The communication apparatus according to claim 2, wherein the threshold setting section sets the criterion so that a first threshold for switching the modulation scheme is higher when a third estimated speed of the change in the propagation path condition is fast than a second threshold for switching the modulation scheme when a fourth estimated speed of the change in the propagation path condition is slow.

4. A communication apparatus comprising:
   a propagation path condition estimation section that estimates a speed of a change in a propagation path condition;
   a communication quality estimation section that changes a method of estimating a communication quality of a received signal, based on the estimated speed of the change in the propagation path condition, and estimates the communication quality;

a transmission section that transmits the estimated communication quality to a communicating party;

a reception section that receives data modulated in a modulation scheme determined by the communicating party based on the estimated communication quality; and a demodulation section that demodulates the received data, wherein:

the communication quality estimation section estimates the communication quality by a plurality of estimation methods, and selects the communication quality estimated by one of the plurality of estimation methods, based on the estimated speed of the change in the propagation path condition; and the communication quality estimation section provides a longer first length of a first term for averaging the communication quality when a first estimated speed of the change in the propagation path condition is fast, and provides a second length of a second term for averaging the communication quality that is shorter than the first length when a second estimated speed of the change in the propagation path condition is slower than the first estimated speed of the change in the propagation condition, and averages information of the communication quality for the longer first length and the shorter second length to estimate the communication quality.

5. The communication apparatus according to claim 4, wherein the estimation method to estimate the communication quality is selected when a third estimated speed of the change in the propagation path condition is faster than a predetermined threshold, and the communication quality estimation section estimates a longer third length of a third term used in the selected estimation method than a fourth term used in another estimation method that is selected when a fourth estimated speed of the change in the propagation path condition is slower than the predetermined threshold.

6. The communication apparatus according to claim 4, wherein the communication quality estimation section estimates a frame error rate when the estimated speed of the change in the propagation path condition is faster than a predetermined threshold, while estimating a received power to noise ratio when the estimated speed of the change in the propagation path condition is slower than the predetermined threshold.

7. A communication apparatus comprising:
a reception section that receives information of a speed of a change in a propagation path condition, the speed of the change in the propagation path condition being estimated by a communicating party;
a threshold setting section that sets a criterion for selecting, from a plurality of modulation schemes, a modulation scheme of a signal to be transmitted to the communicating party, based on the information of the estimated speed of the change in the propagation path condition;
a modulation scheme selection section that selects the modulation scheme based on the set criterion and reception quality of a signal received by the communicating party;
an adaptive modulation section that modulates data in the selected modulation scheme; and
a transmission section that transmits the modulated data by a radio signal, wherein:
one of a fading pitch, a delay profile, and a fluctuation period of received signal power is used as a parameter indicating the estimated speed of the change in the propagation path condition; and the communicating party provides a longer first length of a first term for averaging the reception quality when a first estimated speed of the change in the propagation path condition is fast, and provides a second length of a second teuu for averaging the reception quality that is shorter than the first length when a second estimated speed of the change in the propagation path condition is slower than the first estimated speed of the change in the propagation condition, and averages information of the reception quality for the longer first length and the shorter second length to estimate the reception quality.

8. A communication method comprising:
at the receiving side,
estimating a speed of a change in a propagation path condition;
changing a method of estimating a communication quality of a received signal, based on the estimated speed of the change in the propagation path condition, to estimate the communication quality; and
transmitting information of the estimated communication quality and information of the estimated speed of the change in the propagation path condition, to a transmitting side;
at the transmitting side,
receiving the information of the estimated communication quality and the information of the estimated speed of the change in the propagation path condition, both transmitted from the receiving side;
setting a criterion for selecting, from a plurality of modulation schemes, a modulation scheme of a signal to be transmitted to the receiving side, based on the received information of the estimated speed of the change in the propagation path condition;
selecting the modulation scheme based on the set criterion and the received information of the estimated communication quality;
modulating data in the selected modulation scheme; and
transmitting the modulated data by a radio signal; and
at the receiving side,
receiving the modulated data transmitted from the transmitting side; and
demodulating the received modulated data, wherein:
one of a fading pitch, a delay profile, and a fluctuation period of received signal power is used as a parameter indicating the estimated speed of the change in the propagation path condition, and
the changing of the method of estimating the communication quality comprises providing a longer first length of a first term for averaging the communication quality when a first estimated speed of the change in the propagation path condition is fast, and providing a second length of a second term for averaging the communication quality that is shorter than the first length when a second estimated speed of the change in the propagation path condition is slower than the first estimated speed of the change in the propagation condition, and averaging information of the communication quality for the longer first length and the shorter second length to estimate the communication quality.

9. A communication method comprising:
at a receiving side,
estimating a speed of a change in a propagation path condition;
changing a method of estimating a communication quality of a received signal, based on the estimated speed of the change in the propagation path condition, to estimate the communication quality;

setting a criterion for selecting, from a plurality of modulation schemes, a modulation scheme of a signal that a transmitting side transmits to the receiving side, based on the estimated speed of the change in the propagation path condition;

selecting the modulation scheme based on the estimated communication quality and the set criterion; and transmitting information of the selected modulation scheme to the transmitting side;

at the transmitting side, receiving the information of the selected modulation scheme transmitted from the receiving side;

modulating data in the selected modulation scheme; and transmitting the modulated data by a radio signal; and at the receiving side, receiving the modulated data from the transmitting side; and demodulating the received modulated data, wherein:

one of a fading pitch, a delay profile, and a fluctuation period of received signal power is used as a parameter indicating the estimated speed of the change in the propagation path condition, and the changing of the method of estimating the communication quality comprises providing a longer first length of a first term for averaging the communication quality when a first estimated speed of the change in the propagation path condition is fast, and providing a second length of a second term for averaging the communication quality that is shorter than the first length when a second estimated speed of the change in the propagation path condition is slower than the first estimated speed of the change in the propagation condition, and averaging information of the communication quality for the longer first length and the shorter second length to estimate the communication quality.

* * * * *

UNITED STATES PATENT AND TRADEMARK OFFICE
CERTIFICATE OF CORRECTION

| | | |
|---|---|---|
| PATENT NO. | : 8,014,439 B2 | |
| APPLICATION NO. | : 10/593974 | |
| DATED | : September 6, 2011 | |
| INVENTOR(S) | : Takenori Sakamoto et al. | |

It is certified that error appears in the above-identified patent and that said Letters Patent is hereby corrected as shown below:

Claim 7, column 24, line 5, reads:

"second teuu for averaging the reception quality that is"

and should read:

"second term for averaging the reception quality that is"

Signed and Sealed this
Nineteenth Day of June, 2012

David J. Kappos
*Director of the United States Patent and Trademark Office*